US010568040B2

(12) United States Patent
Takeda et al.

(10) Patent No.: US 10,568,040 B2
(45) Date of Patent: Feb. 18, 2020

(54) TERMINAL AND RADIO COMMUNICATION METHOD

(71) Applicant: NTT DOCOMO, INC., Tokyo (JP)

(72) Inventors: Kazuki Takeda, Tokyo (JP); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 15/999,242

(22) PCT Filed: Feb. 16, 2017

(86) PCT No.: PCT/JP2017/005748
§ 371 (c)(1),
(2) Date: Aug. 17, 2018

(87) PCT Pub. No.: WO2017/142029
PCT Pub. Date: Aug. 24, 2017

(65) Prior Publication Data
US 2019/0116559 A1    Apr. 18, 2019

(30) Foreign Application Priority Data

Feb. 19, 2016   (JP) .................................. 2016-029884

(51) Int. Cl.
*H04W 52/14*   (2009.01)
*H04W 52/22*   (2009.01)
(Continued)

(52) U.S. Cl.
CPC ....... *H04W 52/146* (2013.01); *H04W 52/221* (2013.01); *H04W 52/367* (2013.01); *H04W 52/34* (2013.01)

(58) Field of Classification Search
CPC . H04W 52/146; H04W 52/54; H04W 52/221; H04W 52/367
(Continued)

(56) References Cited

U.S. PATENT DOCUMENTS 7,843,875 B2   11/2010 Somasundaram et al.
9,986,515 B2   5/2018 Benjebbour et al.
(Continued)

FOREIGN PATENT DOCUMENTS

EP   2894908 A1   7/2015
EP   3096568 A1   11/2016
(Continued)

OTHER PUBLICATIONS

Huawei, HiSilicon, "Control signaling enhancements for short TTI," 3GPP TSG RAN WG1 Meeting #83; R1-156461; Anaheim, USA; Nov. 15-22, 2015; 6 pages.
(Continued)

*Primary Examiner* — John J Lee
(74) *Attorney, Agent, or Firm* — Osha Liang LLP

(57) ABSTRACT

In order that a user terminal properly performs communication even when a plurality of TTIs with different time lengths is present, a user terminal of the present invention transmits an uplink shared channel in a normal TTI and/or a shortened TTI including the smaller number of symbols than the normal TTI. The user terminal controls transmission power of the uplink shared channel based on an individual parameter individually set according to a TTI length for transmitting the uplink shared channel.

9 Claims, 13 Drawing Sheets

(51) Int. Cl.
*H04W 52/36* (2009.01)
*H04W 52/34* (2009.01)

(58) Field of Classification Search
USPC .............................. 455/522, 69, 452.1, 509
See application file for complete search history.

(56) References Cited

U.S. PATENT DOCUMENTS

| | | | |
|---|---|---|---|
| 2010/0067496 A1* | 3/2010 | Choi | H04W 52/54 370/336 |
| 2015/0201382 A1 | 7/2015 | Wang et al. | |
| 2016/0135147 A1* | 5/2016 | Ouchi | H04W 52/146 370/329 |
| 2016/0165547 A1* | 6/2016 | Ouchi | H04W 52/146 455/522 |
| 2016/0337984 A1 | 11/2016 | Takeda et al. | |
| 2016/0337987 A1 | 11/2016 | Yi | |

FOREIGN PATENT DOCUMENTS

| | | |
|---|---|---|
| JP | 2010-509843 A | 3/2010 |
| JP | 2015-50575 A | 3/2015 |
| WO | 2015/108009 A1 | 7/2015 |
| WO | 2015/108359 A1 | 7/2015 |

OTHER PUBLICATIONS

Samsung, "Study on specification impact for uplink due to TTI shortening," 3GPP TSG RAN WG1 #83; R1-156822; Anaheim, USA, Nov. 15-22, 2015; 3 pages.

3GPP TS 36.300 V8.5.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8);" May 2008, 134 pages.

International Search Report issued in PCT/JP2017/005748, dated Mar. 21, 2017; 2 pages.

Written Opinion issued in PCT/JP2017/005748, dated Mar. 21, 2017; 4 pages.

Extended European Search Report issued in counterpart European Patent Application No. 17753284.3, dated Dec. 13, 2018 (8 pages).

Office Action issued in counterpart European Patent Application No. 17753284.3, dated Aug. 21, 2019 (6 Pages).

* cited by examiner

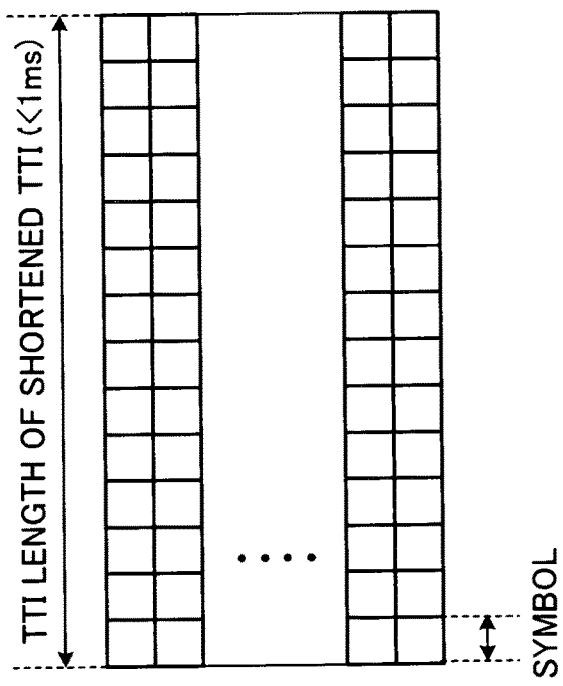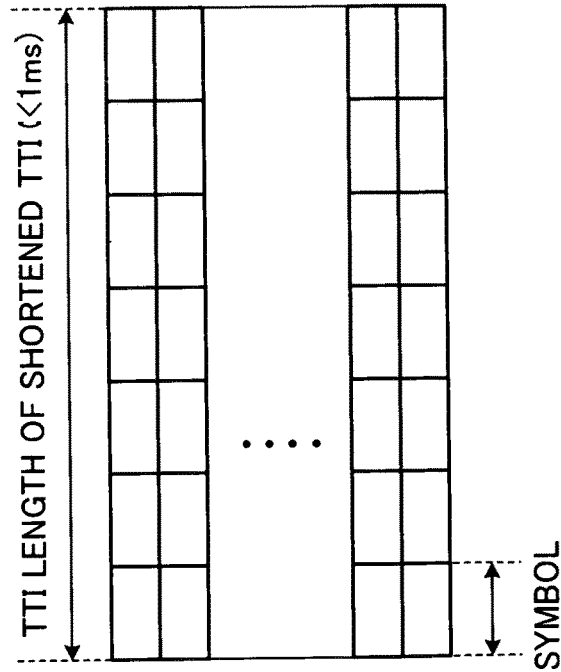

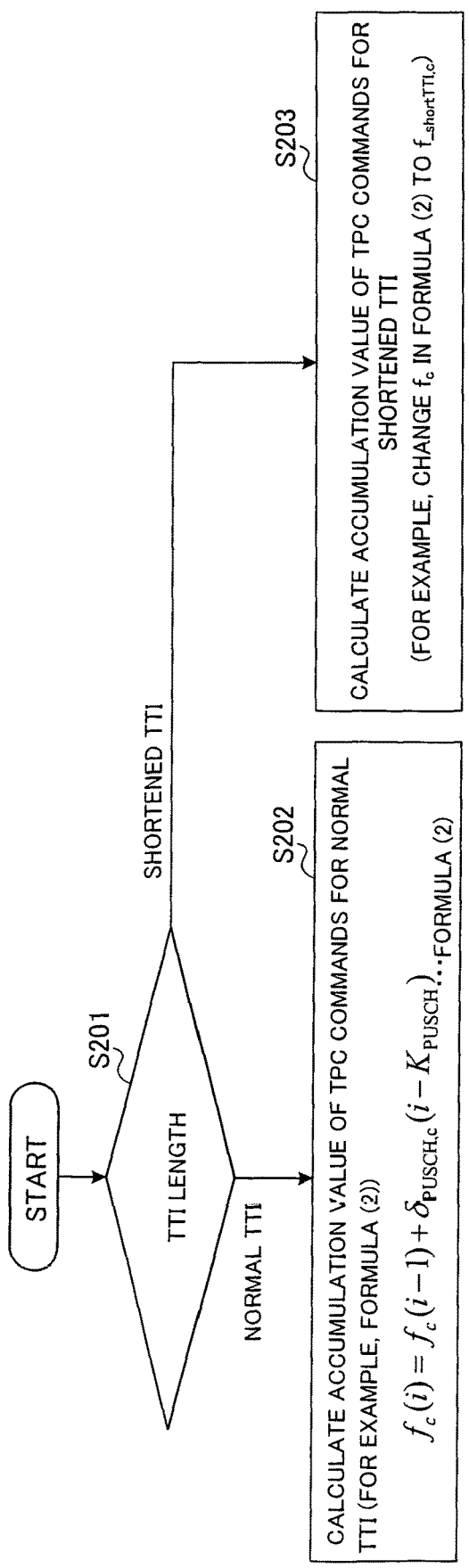
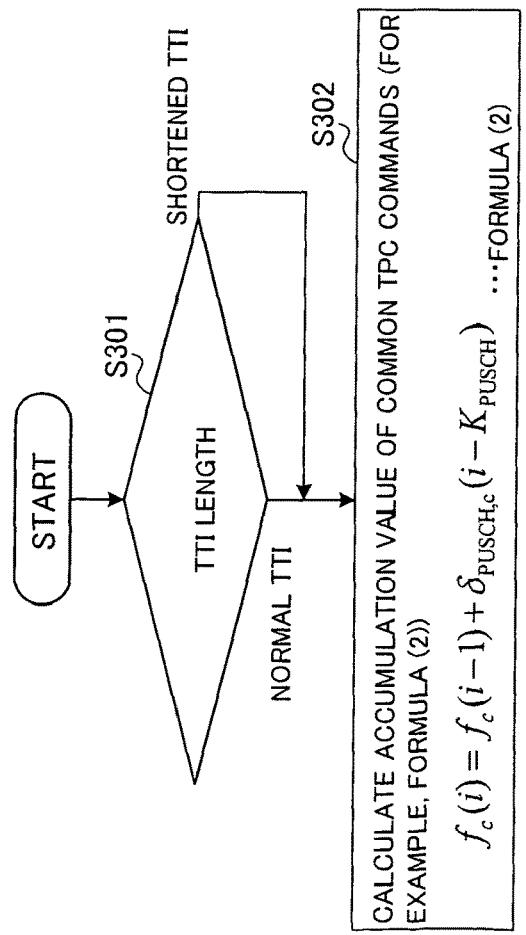

TERMINAL AND RADIO COMMUNICATION METHOD

TECHNICAL FIELD

The present invention relates to a user terminal, a radio base station and a radio communication method in the next-generation mobile communication system.

BACKGROUND ART

In UMTS (Universal Mobile Telecommunications System) networks, for the purpose of higher data rates, low delay and the like, Long Term Evolution (LTE) has been specified (Non-patent Literature 1). Also, for the purpose of wider bands and higher speed than LTE (may be also called LTE Rel. 8 or 9), LTE-A (may be called LTE-Advanced, or LTE Rel. 10, 11, or 12) has been specified, and a successor system (for example, also called FRA (Future Radio Access), 5G (5th generation mobile communication system), LTE Rel. 13, Rel. 14 and the like) to LTE has been studied.

In LTE Rel. 10/11, in order to realize the wider bands, Carrier Aggregation (CA) which integrates a plurality of component carriers (CCs) is introduced. Each CC is configured with the system band of LTE Rel.8 as one unit. Moreover, in CA, a plurality of CCs of the same radio base station (eNB: eNodeB) is set to a user terminal (UE: User Equipment).

Meanwhile, in LTE Rel. 12, dual connectivity (DC) is also introduced in which a plurality of cell groups (CG) of different radio base stations is set to a user terminal. Each cell group is configured by at least one cell (CC). Since a plurality of CCs of different radio base stations is integrated, the DC is also called an Inter-eNB CA or the like.

Moreover, in LTE Rel. 8-12, introduced are a frequency division duplex (FDD), which performs downlink (DL) transmission and uplink (UL) transmission in different frequency bands, and a time division duplex (TDD), which temporally switches DL transmission and UL transmission in the same frequency band.

In LTE Rel. 8-12 as described above, a transmission time interval (TTI), which is applied to the DL transmission and the UL transmission between the radio base station and the user terminal, is set to 1 ms and controlled. A TTI in the existing system (LTE Rel. 8-12) is also called a sub-frame, a sub-frame length or the like.

CITATION LIST

Non-Patent Literature

[Non-Patent Literature 1] 3GPP TS 36.300 Rel. 8 "Evolved Universal. Terrestrial Radio Access (E-UTRA) and Evolved Universal Terrestrial Radio Access Network (E-UTRAN); Overall description; Stage 2"

SUMMARY OF INVENTION

Technical Problem

In future radio communication systems such as LTE after Rel. 13 and 5G, in order to enhance the effect of delay reduction (Latency Reduction) in the existing systems (LTE Rel. 8-12), it is also studied to perform communication by using TTI (hereinafter, referred to as a shortened TTI) of a time length shorter than TTI of 1 ms (hereinafter, referred to as a normal TTI) (TTI shortening). Meanwhile, in the future radio communication systems, in order to maintain compatibility with the existing systems, it is also assumed to perform communication by using the normal TTI.

As described above, in the future radio communication systems, which are assumed to use a plurality of TTIs with different time lengths (i.e., the normal TTI and the shortened TTI), in a case where the communication control of the existing system which uses only the TTI of 1 ms (i.e., the normal TTI) is applied thereto as it is, there is a fear that communication cannot be properly performed. For example, in a case where the transmission power control of the uplink shared channel (PUSCH) of the existing system is applied thereto as it is, there is a fear that the channel estimation accuracy in the shortened TTI may deteriorate.

The present invention has been made in view of such a respect, and aims to provide a user terminal, a radio base station and a radio communication method capable of properly performing communication, even in a case where a plurality of TTIs with different time lengths is mixedly present.

Solution to Problem

An aspect of the user terminal of the present invention includes: a transmission section that transmits an uplink shared channel in a first TTI (Transmission Time Interval) and/or a second TTI including a smaller number of symbols than the first TTI; and a control section that controls transmission power of the uplink shared channel; wherein the control section controls the transmission power based on an individual parameter individually set according to a TTI length for transmitting the uplink shared channel.

Advantageous Effects of Invention

According to the present invention, communication can be properly performed, even in a case where a plurality of TTIs with different time lengths is mixedly present.

BRIEF DESCRIPTION OF DRAWINGS

FIGS. 2A and 2B are diagrams showing a configuration example of a shortened TTI.

FIGS. 7A and 7B are diagrams showing an example of calculating an accumulation value of a TPC command according to the present embodiment.

DESCRIPTION OF EMBODIMENTS

Figure 1:
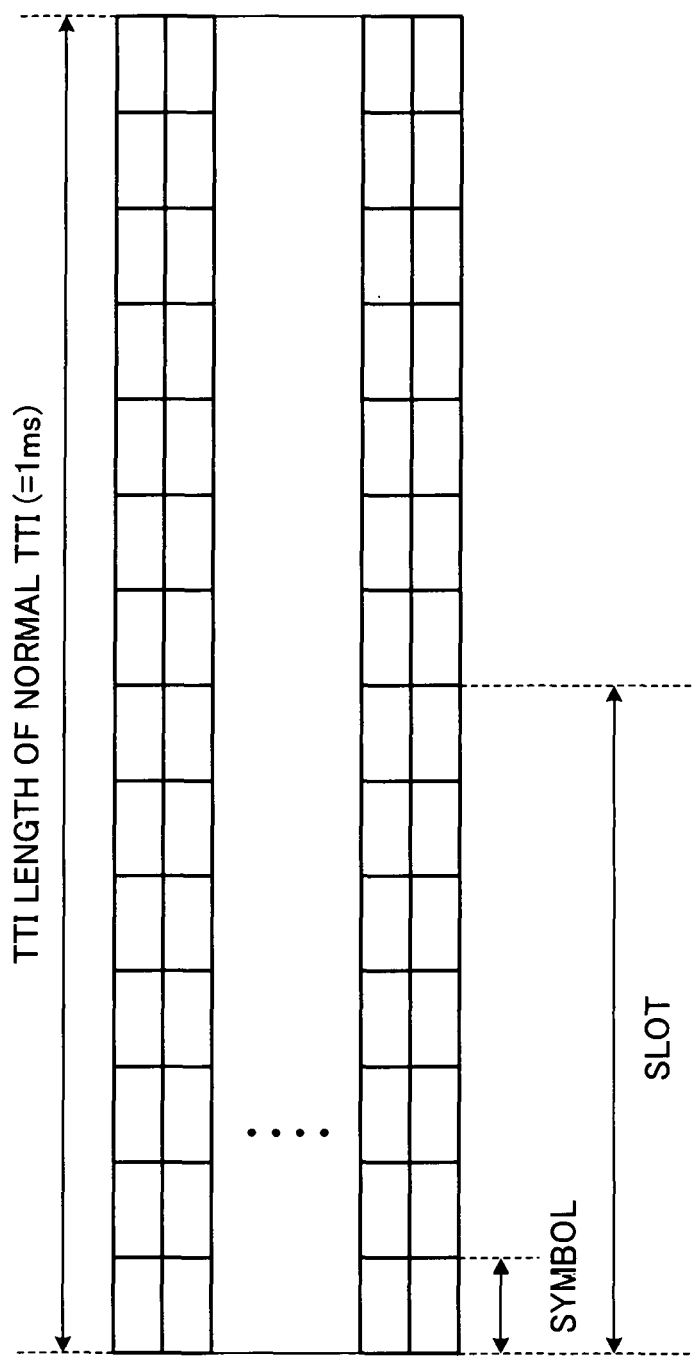
FIG. 1 is a diagram showing a configuration example of a normal TTI.

FIG. 1 is a diagram showing an example of TTI (normal TTI) in the existing systems (LTE Rel. 8-12). As shown in FIG. 1, the normal TTI has a time length of 1 ms. The normal TTI is also called a sub-frame, and is composed of two time slots. Note that, in the existing systems, the normal TTI is a transmission time unit of one data packet which has been channel-coded, and is the unit of processing such as scheduling and link adaptation.

As shown in FIG. 1, in a case of a normal cyclic prefix (CP) in downlink (DL), the normal TTI is configured to include 14 OFDM (Orthogonal Frequency Division Multiplexing) symbols (7 OFDM symbols per slot). Each OFDM symbol has a time length (symbol length) of 66.7 μs, and is added with a normal CP of 4.76 μs. Since the symbol length and a subcarrier spacing have a reciprocal relationship with each other, for the symbol length of 66.7 μs, the subcarrier spacing is 15 kHz.

Moreover, for a normal cyclic prefix (CP) in uplink (UL), the normal TTI is configured to include 14 SC-FDMA (Single Carrier Frequency Division Multiple Access) symbols (7 SC-FDMA symbols per slot). Each SC-FDMA symbol has a time length (symbol length) of 66.7 μs, and is added with a normal CP of 4.76 μs. Since a relation of an inverse number is established between a symbol length and a subcarrier spacing, in a case of the symbol length of 66.7 μs, the subcarrier spacing is 15 kHz.

Note that, although not shown, in a case of an extended CP, the normal TTI may be configured to include 12 OFDM symbols (or 12 SC-FDMA symbols). In this case, each OFDM symbol (or each SC-FDMA symbol) has a time length of 66.7 μs, and is added with an extended CP of 16.67 μs. Moreover, in UL, the OFDM symbols may be used. Hereinafter, in a case where the OFDM symbol and the SC-FDMA symbol are not distinguished from each other, they are referred to as "symbols".

Meanwhile, in the future radio communication systems such as LTE after Rel. 13 and 5G, desired is a radio interface suitable for high frequency bands such as several tens of GHz, or a radio interface that has a small packet size but minimizes a delay so as to be suitable for communication with a relatively small amount of data such as IoT (Internet of Things), MTC (Machine Type Communication), and M2M (Machine To Machine).

In the shortened TTI of the time length shorter than the normal TTI, temporal margins for processing (for example, coding, decoding or the like) in the user terminal or the radio base station are increased compared with the normal TTI, and thus the processing delay can be reduced. Moreover, in the shortened TTI, the number of user terminals that can be accommodated per unit time (e.g., 1 ms) can be increased compared with the normal TTI. Therefore, in the future radio communication systems, as the transmission time unit of one data packet which has been channel-coded, or as the unit of processing such as scheduling and link adaptation, it is considered to use the shortened TTI shorter than the normal TTI.

The shortened TTI will be described with reference to FIGS. 2A and 2B. FIGS. 2A and 2B are diagrams showing a configuration example of the shortened TTI. As shown in FIGS. 2A and 2B, the shortened TTI has a time length (TTI length) shorter than 1 ms. The shortened TTI may have at least one time length of, for example, 0.5 ms, 0.2 ms, and 0.1 ms whose multiple is 1 ms. Alternatively, in the case of the normal CP, since the normal TTI includes 14 symbols, the shortened TTI may have at least one time length which is an integral multiple of 1/14 ms, such as 7/14 ms, 6/14 ms, 5/14 ms, 4/14 ms, 3/14 ms, 2/14 ms, or 1/14 ms.

FIG. 2A is a diagram showing a first configuration example of the shortened TTI. As shown in FIG. 2A, in the first configuration example, the shortened TTI is constituted by the same number of symbols as that of the normal TTI (here, 14 symbols), and each symbol has a symbol length shorter than the symbol length of the normal TTI (e.g., 66.7 μs).

As shown in FIG. 2A, in the case where the number of symbols of the normal TTI is maintained and the symbol length is shortened, the physical layer signal configuration (RE arrangement or the like) of the normal TTI can be diverted. Moreover, in the case where the number of symbols of the normal TTI is maintained, the same amount of information (bit amount) as that of the normal TTI can be included also in the shortened TTI. Meanwhile, since the symbol time length is different from that of the normal TTI symbol, it is difficult to frequency-multiplex a signal of shortened TTI shown in FIG. 2A and a signal of normal TTI within the same system band (or, cell, CC).

Moreover, since a relation of an inverse number is established between the symbol length and the subcarrier spacing, in a case where the symbol length is shortened as shown in FIG. 2A, the subcarrier spacing is wider than 15 kHz of the normal TTI. When the subcarrier spacing is widened, it is possible to effectively prevent inter-channel interference due to Doppler shift when the user terminal is moving or deterioration of transmission quality due to phase noise of the receiver of the user terminal. In particular, in high frequency bands such as several tens of GHz, the deterioration of transmission quality can be effectively prevented by widening the subcarrier spacing.

FIG. 2B is a diagram showing a second configuration example of the shortened TTI. As shown in FIG. 2B, in the second configuration example, the shortened TTI is composed of the smaller number of symbols than the normal TTI, and each symbol has the same symbol length as the normal TTI (e.g., 66.7 μs). For example, in FIG. 2B, assuming that the shortened TTI has half the time length (0.5 ms) of the normal TTI, the shortened TTI is composed of half the symbols of the normal TTI (here, 7 symbols).

As shown in FIG. 2B, in the case where the symbol length is maintained and the number of symbols is reduced, the amount of information (bit amount) included in the shortened TTI can be reduced compared with that included in the normal TTI. Therefore, the user terminal can perform reception processing (for example, demodulation, decoding, or the like) of information included in the shortened TTI in a time shorter than the normal TTI, and thus the processing delay can be shortened. Moreover, the signal of shortened TTI shown in FIG. 2B and the signal of normal TTI can be frequency-multiplexed within the same frequency band (or cell, CC), and thus the compatibility with the normal TTI can be maintained.

Note that, FIGS. 2A and 2B show an example of the shortened TTI assuming the case of the normal CP (the case where the normal TTI is composed of 14 symbols), but a configuration of the shortened TTI is not limited to that of FIGS. 2A and 2B. For example, in the case of the extended CP, the shortened TTI of FIG. 2A may be composed of 12 symbols, or the shortened TTI of FIG. 2B may be composed of 6 symbols. In this way, the shortened TTI may have a time length shorter than the normal TTI, and the number of symbols, symbol length, CP length and the like in the shortened TTI may be any value.

In the second configuration example shown in FIG. 2B, since the symbol length is same between the signal of shortened TTI and the signal of normal TTI, interference hardly occurs even when the shortened TTI and the normal TTI are frequency division multiplexed in the same frequency band (or, cell, CC). Therefore, from the viewpoint of the compatibility with the existing systems (LTE Rel. 8-12) to support only the normal TTI, it is desired for the second configuration example, namely, the shortened TTI composed of the smaller number of symbols than the normal TTI.

On the other hand, as in the second configuration example shown in FIG. 2B, in the case where the shortened TTI is composed of the smaller number of symbols than the normal TTI, the total number of resource elements (RE) included in one TTI (hereinafter, RE total number) decreases. Here, the RE is a resource specified by the subcarrier and the symbol, and one RE is composed of one subcarrier and one symbol. Moreover, one Resource block (PRB: Physical Resource Block) includes 12 subcarriers. Therefore, in the case of the normal TTI composed of 14 symbols, RE total number=PRB number×12 subcarriers×14 symbols=PRB number×168. Meanwhile, for example, in the case of the shortened TTI composed of 4 symbols, RE total number=PRB number×12 subcarriers×4 symbols=PRB number×48.

Moreover, in the shortened TTI, all REs cannot be assigned to data signals. Specifically, in the shortened TTI, it is assumed that a RE for mapping L1/L2 (layer 1/layer 2) control signals is necessary. For example, in a PDCCH (Physical Downlink Control Channel) which is an existing L1/L2 control signal, any one of 36 REs, 72 REs, 144 REs, and 288 REs per downlink control information (DCI: Downlink Control Channel) are consumed. By reducing the amount of information on the DCI (e.g., scheduling control information), the number of REs required for transmitting the DCI can be reduced to some extent, but a certain number of REs are required to be assigned to the DCI.

Moreover, in the shortened TTI, it is also assumed that an RE for mapping various reference signals is necessary. For example, for a cell-specific reference signal (CRS) used for downlink channel estimation, 16 REs (in the case of two antenna ports) per one PRB/one normal TTI are consumed. Moreover, for a demodulation reference signal (DMRS: DeModulation Reference Signal) used for uplink channel estimation, 24 REs per one PRB/one normal TTI are consumed. The number of REs required for a channel estimation reference signal can be reduced to some extent by allowing deterioration in channel estimation accuracy and a reduction in coverage, but a certain number of REs are required to be assigned to the reference signal. Moreover, there may be a case where it is necessary to assign a certain number of REs to a reference signal other than for channel estimation (for example, Sounding reference signal (SRS)).

Accordingly, as in the second configuration example shown in FIG. 2B, in a case where the shortened TTI is composed of the smaller number of symbols than the normal TTI, it becomes a problem how to reduce the overhead of the L1/L2 control signal and/or the reference signal. For example, on uplink, it is also considered to share the same symbol for reference signal among a plurality of shortened TTIs as a method of reducing the overhead of the reference signal in the shortened TTI.

Figure 3A:
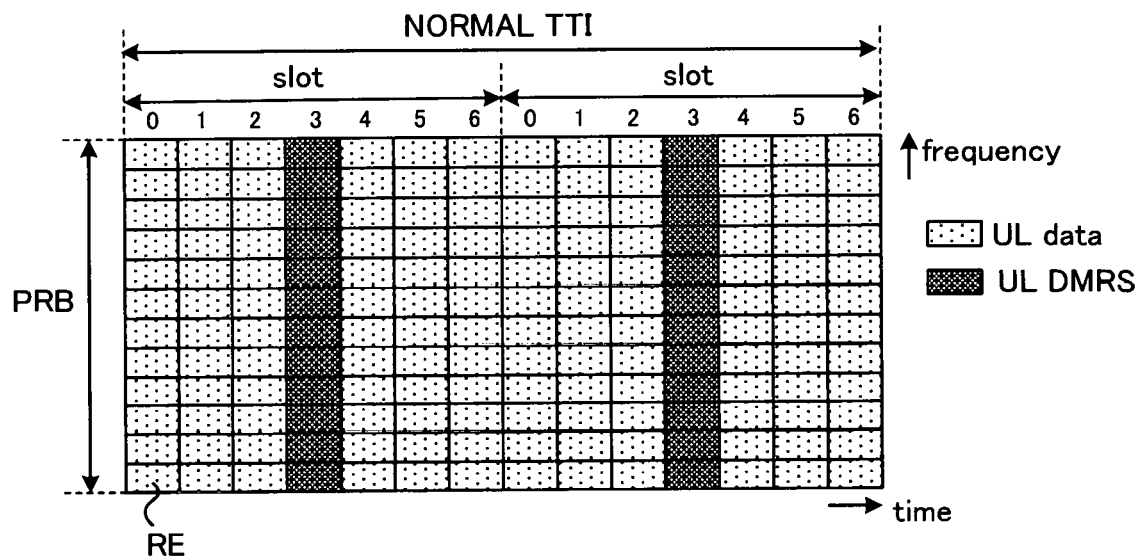
FIGS. 3A and 3B are diagrams showing a configuration example of PUSCH in a normal TTI and a shortened TTI.
Figure 3B:
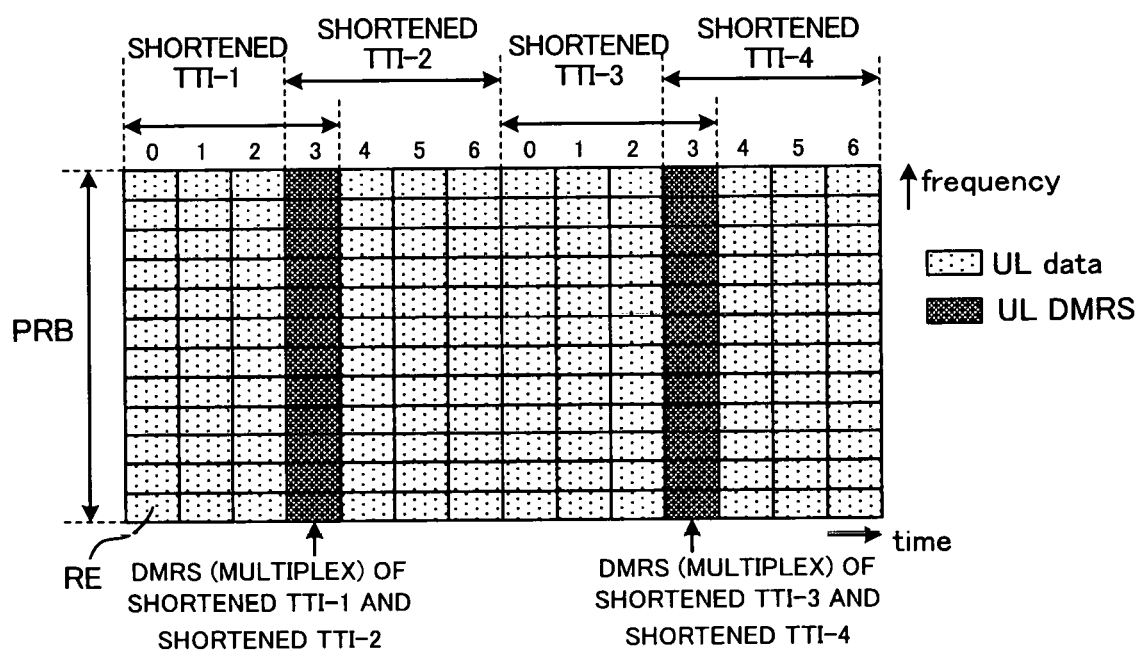

FIGS. 3A and 3B are diagrams showing a configuration example of PUSCH in the normal TTI and the shortened TTI, respectively. FIGS. 3A and 3B show the case where the normal CP is added to each symbol as an example, but the configuration is not limited to this. The case where the extended CP is used can be also applied as needed.

As shown in FIG. 3A, in the normal TTI, the DMRS used for demodulation (channel estimation) of PUSCH is mapped to a predetermined symbol of each slot. For example, in FIG. 3A, the DMRS is mapped to the center symbol of each slot (symbol of index 3). Hereinafter, the predetermined symbol to which the DMRS is mapped is referred to as a DMRS symbol.

FIG. 3B shows the case where there are four shortened TTIs per a normal TTI. Note that, the number of shortened TTIs included in the normal TTI and the number of symbols in the shortened TTI are not limited to those shown in FIG. 3B. Moreover, in FIG. 3B, the DMRS is mapped to the same symbol as in the normal TTI, but the position and the number of the DMRS symbols are not limited to those shown in FIG. 3B.

In FIG. 3B, the DMRS symbol (hereinafter, first DMRS symbol) in the first half slot of the normal TTI is included in both a shortened TTI-1 and a shortened TTI-2, and is used in common for the shortened TTI-1 and the shortened TTI-2. Moreover, the DMRS symbol (hereinafter, second DMRS symbol) in the first half slot of the normal TTI is included in both a shortened TTI-3 and a shortened TTI-4, and is used in common for the shortened TTI-3 and the shortened TTI-4.

As shown in FIG. 3B, when a single DMRS symbol is used in common for a plurality of shortened TTIs, DMRSs in the plurality of shortened TTIs are multiplexed with the single DMRS symbol. For example, the DMRSs in the plurality of shortened TTIs may be multiplexed with the single DMRS symbol by cyclic shift (CS) and/or comb tooth-like subcarrier arrangement (Comb).

Figure 4A:
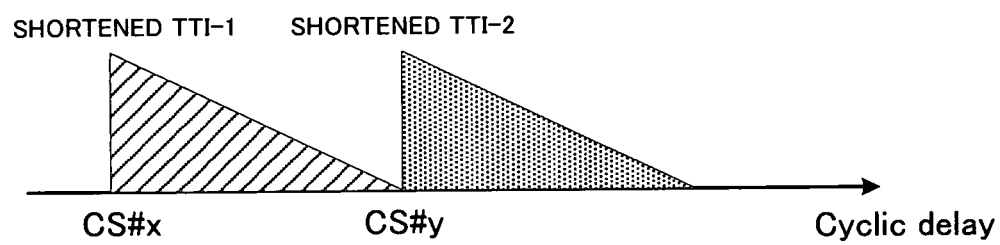
FIGS. 4A and 4B are diagrams showing an example of multiplexing DMRSs of a plurality of shortened TTIs.
Figure 4B:
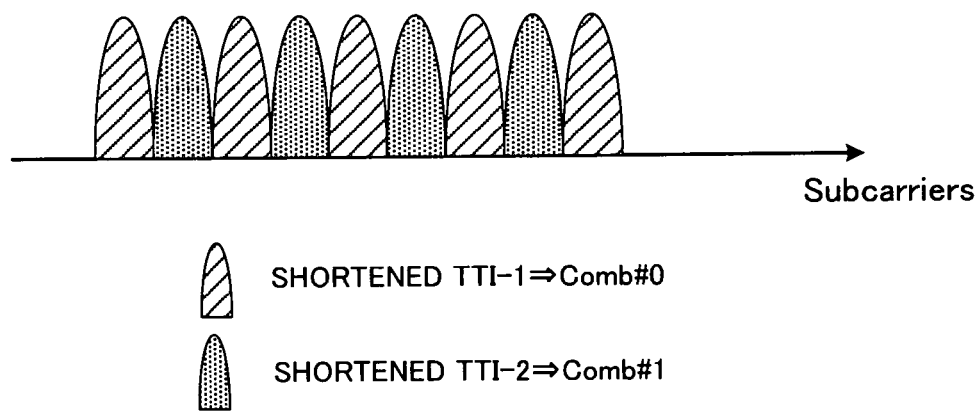

FIGS. 4A and 4B are diagrams showing an example of multiplexing DMRSs of a plurality of shortened TTIs for which the same DMRS symbol is used in common. FIGS. 4A and 4B illustrate an example of multiplexing DMRSs in the case where the shortened TTI-1 and the shortened TTI-2 in FIG. 3B share the first DMRS symbol as an example, but the case where the second DMRS symbol is used in common for the shortened TTI-3 and the shortened TTI-4 can be also applied.

FIG. 4A shows an example of multiplexing with cyclic shift. The DMRS of each shortened TTI is generated with a different CS index and is mapped to the same DMRS symbol. For example, in FIG. 4A, the DMRS of the shortened TTI-1 is generated with a CS index # x, while the DMRS of the shortened TTI-2 is generated with a CS index # y. Note that the CS indexes of each shortened TTI may be indicated with a predetermined field (for example, CS/OCC indicator field (Cyclic shift/Orthogonal Cover Code indicator field), Cyclic shift field, or the like) in the DCI.

FIG. 4B shows an example of multiplexing with Comb. As shown in FIG. 4B, Comb #0 subcarriers and Comb #1 subcarriers are alternately arranged. A different Comb (subcarrier) is assigned to the DMRS of each shortened TTI. For example, in FIG. 4B, Comb #0 is assigned to the DMRS of the shortened TTI-1, while Comb #1 is assigned to the DMRS of the shortened TTI-2. The Comb of each shortened TTI may be specified by a predetermined field (e.g., CS/OCC field or the like) in the DCI (for example, Comb #0 if the predetermined field value=0, etc.), or may be preliminarily determined depending on which shortened TTI it is (for example, Comb #0 if it is shortened TTI 1, etc.).

As described above, in the case of multiplexing the plurality of DMRSs of different shortened TTIs with a single DMRS symbol using cyclic shift or Comb, it is desired that the plurality of DMRSs is orthogonal (complete orthogonal) to one another. However, in the case of multiplexing the plurality of DMRSs with cyclic shift, if the frequency selectivity of the channel becomes strong, the plurality of DMRSs may not be orthogonal to one another. Moreover, in the case of multiplexing the plurality of DMRSs with Comb, if the transmission frequency offset increases, the plurality of DMRSs may not be orthogonal to one another.

As described above, in the case of using the same DMRS symbol in common for the plurality of shortened TTIs, if the DMRSs of the plurality of shortened TTIs which are multiplexed with the same DMRS symbol are not orthogonal to one another, the interference may occur between the DMRSs of the plurality of shortened TTIs, channel estimation accuracy may decrease, and error rate (e.g., BLER: Block Error Rate) may deteriorate.

In addition, in the existing systems (LTE Rel. 8-12), as transmission power control of PUSCH, fractional TPC (Fractional Transmission Power Control) is employed which increases transmission power as the path-loss is smaller (closer to the radio base station). For example, transmission power $P_{PUSCH,c}(i)$ of PUSCH in a sub-frame i of cell c can be expressed by the following formula (1).

[Mathematical formula 1]
$$P_{PUSCH,c}(i) = \min\begin{Bmatrix} P_{CMAX,c}(i), \\ 10\log_{10}(M_{PUSCH,c}(i)) + \\ P_{O\_PUSCH,c}(j) + \alpha_c(j) \cdot \\ PL_c + \Delta_{TF,c}(i) + f_c(i) \end{Bmatrix}$$

where $P_{CMAX,c}(i)$ is maximum transmission power of a user terminal, $M_{PUSCH,c}(i)$ is a bandwidth for PUSCH assigned to the user terminal (e.g., the number of resource blocks), $P_{O\_PUSCH,c}(j)$ is a parameter related to target received power (target received SNR: Signal to Noise Ratio) (e.g., parameter related to a transmission power offset) (hereinafter, referred to as a target received power parameter), $\alpha_c(j)$ is a weighting factor of a fractional TPC, $PL_c$ is a path-loss (propagation loss), $\Delta_{TF,c}(i)$ is an offset based on the modulation and coding scheme (MCS) applied to PUSCH, and $f_c(i)$ is a correction value by a TPC command.

Note that, the $P_{CMAX,c}(i)$, $M_{PUSCX,c}(i)$, $P_{O\_PUSCH,c}(j)$, $\alpha_c(j)$, $PL_c$, $\Delta_{TF,c}(i)$, and $f_c(i)$ may be expressed simply as $P_{CMAX}$, $M_{PUSCH}$, $P_{O\_PUSCH}$, $\alpha$, $PL$, $\Delta_{TF}$, and $f$, respectively, excluding the cell c, sub-frame i, and predetermined subscript j.

Figure 5:
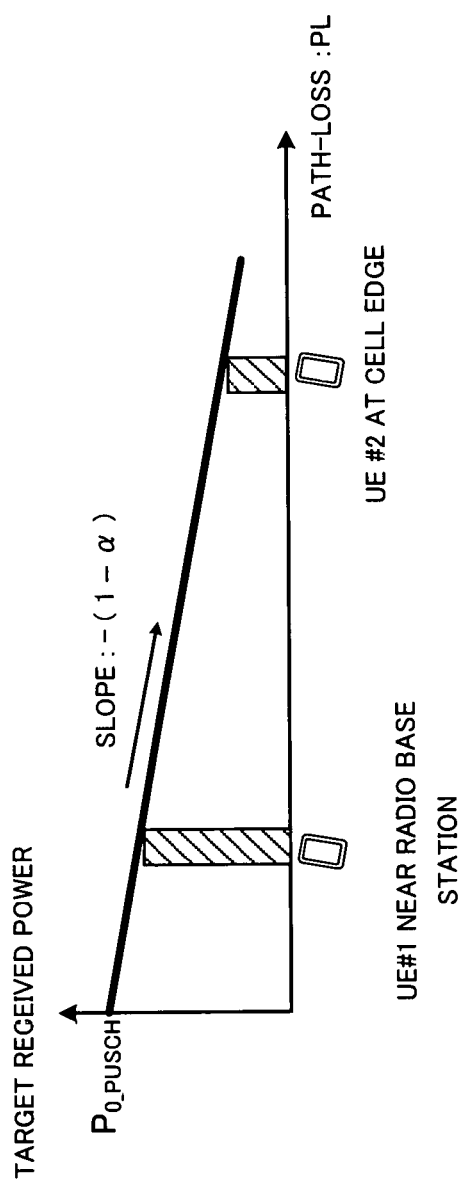
FIG. 5 is an explanatory diagram of fractional TPC.

FIG. 5 is an explanatory diagram of the fractional TPC. In FIG. 5, the vertical axis indicates the target received power parameter ($P_{O\_PUSCH}$), and the horizontal axis indicates the path-loss (PL). As shown in FIG. 5, it is considered that if the path-loss is large, the user terminal exists at the cell edge, and if the path-loss is small, the user terminal exists near the radio base station. Accordingly, if transmission power control is performed so that the received power of a user terminal #1 near the radio base station is relatively large and the received power of a user terminal #2 at the cell edge is relatively small, throughput of the user terminal #1 near the radio base station can be improved and interference given to the adjacent another cell by the user terminal #2 far from the radio base station can be reduced. Such control is realized by multiplying a transmission power offset guaranteeing the path-loss (PL) by a predetermined weighting factor ($\alpha$).

Moreover, as shown in FIG. 5, in the fractional TPC, the relationship between the path-loss and the target received power is shown by a primary characteristic line whose slope is $-(1-\alpha)$. Therefore, in the case of setting the weighting factor ($\alpha$) of the fractional TPC smaller than 1, the fractional TPC is applied (validated), and in the case of setting the weighting factor ($\alpha$) to 1, the fractional TPC is not applied (invalidated). In this way, whether the fractional TPC is applied or not and the degree of application are controlled based on the set value of the weighting factor ($\alpha$).

As shown in FIG. 5, in the fractional TPC, since the higher target received power parameter ($P_{O\_PUSCH}$) is set for the user terminal (at the cell center) closer to the radio base station, the received power of the user terminal #1 at the cell center (the received SNR) is higher than the received power of the user terminal #2 at the cell edge. As a result, the uplink user throughput of the user terminal #1 at the cell center is higher than that of the user terminal #2 at the cell edge. Moreover, since the transmission power of the user terminal #2 at the cell edge is relatively lower, the influence on the adjacent another cell can be reduced.

However, in the case of applying the fractional TPC, there will occur a difference in the received power between the user terminal #1 at the cell center and the user terminal #2 at the cell edge. Therefore, in the case where the same DMRS symbol is used in common between the user terminals #1 and #2 having difference in received power, the DMRS of the user terminal #2 having low received power may receive interference by the DMRS of the user terminal #1 having high received power. Note that, it is considered that the transmission power of the DMRS is equal to the transmission power of PUSCH transmitted in the same shortened TTI.

For example, in the case where the user terminal #1 at the cell center is assigned to the shortened TTI-1 and the user terminal #2 at the cell edge is assigned to the shortened TTI-2 in FIG. 3B, it is assumed that in the first DMRS symbol, the DMRS of user terminal #1 is transmitted by the fractional TPC with transmission power higher than the DMRS of the user terminal #2. In this case, the interference between the DMRSs of the user terminals #1 and #2 in the first DMRS symbol may further deteriorate the channel estimation accuracy.

As described above, in the first DMRS symbol used in common for the shortened TTI-1 and the shortened TTI-2, since the DMRS of the user terminal #1 of the shortened TTI-1 and the DMRS of the user terminal #2 of the shortened TTI-2 are multiplexed by cyclic shifts or CS, interference due to non-orthogonality between DMRSs of the user terminals #1 and #2 may also occur. Accordingly, in order to prevent the further deterioration of the channel estimation accuracy, it is desirable to avoid interference between the DMRSs of the user terminals #1 and #2 due to the influence of the fractional TPC.

As a method for avoiding the interference between DMRSs of the user terminals #1 and #2 due to the influence of the fractional TPC, it is considered to stop application of the fractional TPC, or to perform scheduling for assigning a plurality of user terminals equal in received power (equal in path-loss, and equal in distance from the radio base station) to a plurality of shortened TTIs using the same DMRS symbol in common.

However, in the future radio communication systems in which the shortened TTI and the normal TTI are mixedly present, in the case of stopping application of the fractional TPC uniformly in order to avoid the interference between DMRSs of the user terminals #1 and #2 in the shortened TTI-1 and the shortened TTI-2, throughput of the user terminal in the normal TTI may not be optimized. Moreover, in the case of assigning a plurality of user terminals which is equal in received power to the plurality of shortened TTIs using the same DMRS symbol in common, scheduling may become complicated.

Accordingly, the present inventors have studied a method in which the user terminals can properly perform communications in both the shortened TTI and the normal TTI in the future radio communication system in which the shortened TTI and the normal TTI are mixedly present, and arrived at the present invention. Specifically, the present inventors have conceived of performing different transmission power control between a user terminal assigned to the shortened TTI and a user terminal assigned to the normal TTI.

(Radio Communication Method)

Hereinafter, a radio communication method according to an embodiment of the present invention will be described. The present embodiment assumes that the shortened TTI (second TTI) is composed of the smaller number of symbols than the normal TTI (first TTI), and each symbol has the same symbol length as the normal TTI (see FIG. 2B), but the configuration is not limited to this. For example, the shortened TTI in the present embodiment can be applied to the configuration example shown in FIG. 2A as needed. The number of symbols included in the shortened TTI is, for example, 2, 4, 5, 6, and 7, but it is not limited thereto.

Moreover, the shortened TTI is also referred to as a partial TTI, short TTI, shortened TTI, shortened sub-frame, and short sub-frame, etc. The normal TTI is also referred to as a TTI, long TTI, ITTI, normal TTI, normal sub-frame, long sub-frame, and normal sub-frame, or simply as sub-frame or the like.

Moreover, in the present embodiment, the normal CP may be applied to each symbol in the normal TTI and/or the shortened TTI, or the extended CP may be applied. Which of the normal CP and the extended CP is applied in the shortened TTI and/or may be configured by higher layer signaling, such as broadcast information or RRC (Radio Resource Control) signaling.

In the radio communication method according to the present embodiment, the user terminal performs uplink and/or downlink communication with the radio base station in the normal TTI (first TTI) and/or the shortened TTI (second TTI). Specifically, the user terminal may transmit PUSCH in the normal TTI and/or the shortened TTI.

<Transmission Power Control>

In the present embodiment, the user terminal controls transmission power of PUSCH based on an individual parameter individually set according to the time length of TTI (TTI length) for transmitting the PUSCH. Moreover, the user terminal may control transmission power of PUSCH based on a common parameter commonly set regardless of the TTI length for transmitting the PUSCH, in addition to the individual parameter.

Here, the individual parameter is a parameter set for each TTI length (i.e., parameter individually set for the normal TTI and the shortened TTI). For example, the individual parameter may include at least one of a weighting factor of fractional TPC, a target received power parameter of PUSCH, and a correction value by a TPC command.

Moreover, the common parameter is a parameter commonly set to each TTI length (i.e., parameter commonly set for the normal TTI and the shortened TTI). For example, the common parameter may include at least one of maximum transmission power of a user terminal, a transmission bandwidth of PUSCH, a path-loss, an offset based on MCS of PUSCH, and a correction value by a TPC command.

In the present embodiment, the individual parameters for the normal TTI and the common parameters are set based on broadcast information, and/or user terminal-specific control information (hereinafter, referred to as UE-specific control information) notified by higher layer signaling or L1/L2 control signals (i.e., may be included in the broadcast information and/or the UE-specific control information, or may be calculated based on information included in the broadcast information and/or the UE-specific control information).

Moreover, the individual parameters for the shortened TTI are set based on UE-specific control information additionally notified by higher layer signaling or L1/L2 control signals (i.e., may be included in the UE-specific control information, or may be calculated based on information included in the UE-specific control information).

Figure 6:
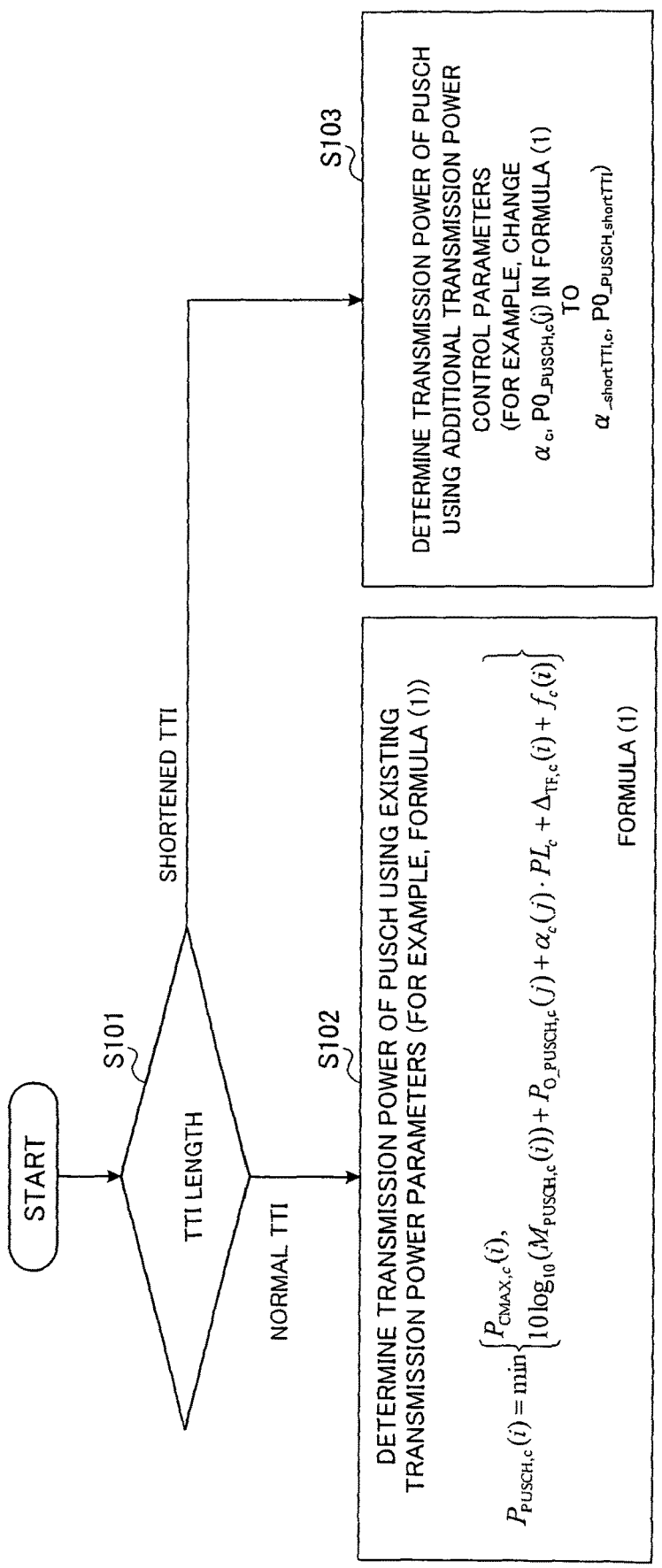
FIG. 6 is a diagram showing an example of controlling transmission power of PUSCH according to the present embodiment.

An example of transmission power control according to the present embodiment will be described with reference to FIG. 6. As shown in FIG. 6, the user terminal determines a TTI length for transmitting the PUSCH (whether or not it is the normal TTI or whether or not it is the shortened TTI) (step S101).

In the case of transmitting a PUSCH in the normal TTI, the user terminal determines transmission power of the PUSCH based on the individual parameters for the normal TTI (for example, a weighting factor ($\alpha$) of fractional TPC and a target received power parameter ($P_{0\_PUSCH}$)) and the common parameters (for example, maximum transmission power ($P_{CMAX}$), a transmission bandwidth of the PUSCH ($M_{PUSCH}$), path-loss (PL), offset based on MCS ($\Delta_{TF}$), and a correction value (f) by a TPC command) (step 102). In this way, in the case of transmitting the PUSCH in the normal TTI, the user terminal can determine the transmission power of the PUSCH using the existing transmission power control parameters (parameters used in the formula (1)).

Note that the maximum transmission power ($P_{CMAX}$), and the weighting factor ($\alpha$) of the fractional TPC may be included in UE-specific control information signaled using higher layer signaling. Moreover, the target received power parameter ($P_{0\_PUSCH}$) is calculated based on a predetermined target transmission power ($P_{0\_NOMINAL\_PUSCH}$) and a user terminal-specific target transmission power ($P_{0\_UE\_PUSCH}$), and the target transmission power ($P_{0\_NOMINAL\_PUSCH}$, $P_{0\_UE\_PUSCH}$) may be included in the UE-specific control information signaled using higher layer signaling.

Moreover, the path-loss (PL) is calculated based on the transmission power and received power of a reference signal, and the transmission power may be included in the UE-specific control information signaled using higher layer signaling. The offset ($\Delta_{TF}$) may be calculated based on an offset signaled using higher layer signaling. Moreover, the transmission bandwidth ($M_{PUSCH}$) may be specified by the DCI. Moreover, the correction value (f) by the TPC command may be a value of the TPC command included in the DCI, or an accumulation value of TPC commands included in the DCI.

On the other hand, in the case of transmitting the PUSCH in the shortened TTI, the user terminal determines transmission power of the PUSCH based on the individual parameters for the shortened TTI (for example, a weighting factor ($\alpha_{\_shortTTI}$) of the fractional TPC and a target received power parameter ($P_{0\_PUSCH\_shortTTI}$)), and the common parameters (for example, maximum transmission power ($P_{CMAX}$), transmission bandwidth ($M_{PUSCH}$) of PUSCH, Path-loss (PL), an offset ($\Delta_{TF}$) based on MCS, and a correction value (f) by a TPC command) (step 103). In this way, in the case of transmitting the PUSCH in the shortened TTI, the user terminal can change a part of the existing transmission power control parameters (parameters used in the above formula (1)) into parameters for the shortened TTI to determine the transmission power of the PUSCH.

Note that the weighting factor ($\alpha_{\_shortTTI}$) of the fractional TPC for the shortened TTI may be included in the UE-specific control information signaled using higher layer signaling, apart from the weighting factor ($\alpha$) of the fractional TPC. Moreover, a target received power parameter for the shortened TTI ($P_{0\_PUSCH\_shortTTI}$) is set to a value suitable for the weighting factor ($\alpha_{\_shortTTI}$). The target received power parameter ($P_{0\_PUSCH\_shortTTI}$) may be included in the UE-specific control information signaled using higher layer signaling, or may be calculated based on a target received power ($P_{0\_NOMINAL\_PUSCH}$, $P_{0\_UE\_PUSCH}$) signaled using higher layer signaling.

Moreover, in the PUSCH of the normal TTI and the shortened TTI, it is contemplated that the arrangement and the number of the reference signals, the code rate of data and the like may vary, and in this case, it is contemplated that an appropriate required SNR may vary. Therefore, the weighting factor ($\alpha_{\_shortTTI}$) of the fractional TPC for the shortened TTI and the target received power parameter ($P_{0\_PUSCH\_shortTTI}$) may be selected from among parameter sets which are different from the weighting factor ($\alpha$) of the fractional TPC for the normal TTI and the target received power parameter ($P_{0\_PUSCH}$). Specifically, $P_{O\_PUSCH\_shortTTI}$ can be selected from values greater than $P_{O\_PUSCH}$. Moreover, $\alpha_{\_shortTTI}$ can be selected from values greater than $\alpha$.

In step S102 of FIG. 6, the weighting factor ($\alpha$) of the fractional TPC used in the normal TTI is set smaller than 1. As described with reference to FIG. 5, when the weighting factor ($\alpha$) is set smaller than 1, the fractional TPC is validated, and the target received power parameter ($P_{0\_PUSCH}$) is set based on the path-loss (PL). As a result, the user terminal #1 at the cell center can transmit the PUSCH with higher transmission power than the user terminal #2 at the cell edge, and thus the throughput of the user terminal #1 can be improved.

On the other hand, in step S103 of FIG. 6, the weighting factor ($\alpha_{\_shortTTI}$) of the fractional TPC used in the shortened TTI is set to a value (e.g., 1) greater than the weighting factor of the fractional TPC used in the normal TTI. As described with reference to FIG. 5, when the weighting factor ($\alpha_{\_shortTTI}$) is set to 1, the fractional TPC is invalidated, and there is no change in the target received power parameter ($P_{0\_PUSCH\_shortTTI}$) due to the path-loss (PL). Therefore, even when the same DMRS symbol is used in common between the user terminals #1 and #2 having greatly different path-losses (received power) (see FIG. 3B), it is possible to reduce interference given to the DMRS of the user terminal #2 having low received power from the DMRS of the user terminal #1 having high received power. Even if the weighting factor ($\alpha_{\_shortTTI}$) is 0.9, etc., a certain effect can be obtained.

FIG. 6 describes the case where the weighting factor of the fractional TPC and the target received power parameter are used as the individual parameter, but the individual parameter is not limited thereto. The individual parameter may include other transmission power control parameters that are used in the formula (1) (for example, at least one of maximum transmission power for the shortened TTI, a transmission bandwidth of the PUSCH for the shortened TTI, a path-loss for the shortened TTI, an offset for the shortened TTI, and a correction value of a TPC command for the shortened TTI) and other parameters that are not used in the formula (1). In this case, the individual parameter for the shortened TTI may be notified by an information element (IE) which is different from the individual parameter for the normal TTI.

As explained above, in the present embodiment, the transmission power of the PUSCH is controlled based on the individual parameter set according to each TTI length. Accordingly, transmission power control can be performed according to each TTI length and communication can be performed properly, even when a plurality of TTIs with different time lengths is mixedly present.

More specifically, in the present embodiment, in the case of transmitting the PUSCH in the normal TTI, the fractional TPC is validated, and in the case of transmitting the PUSCH in the shortened TTI, the fractional TPC is invalidated. Accordingly, in the normal TTI, it is possible to provide throughput according to the path-loss (position or received power) of the user terminal. Moreover, in the shortened TTI, even in the case of using the same DMRS symbol in common between the user terminals having different path-losses (see FIG. 3B), it is possible to prevent the deterioration of the channel estimation accuracy due to interference between the DMRSs of the user terminals.

Note that, even in the case of setting the shortened TTI, in the case of not using the same DMRS symbol in common for the plurality of shortened TTIs (for example, the case where the shortened TTI is composed of a single slot (e.g., 7 symbols)), the individual parameter for the shortened TTI may be set to validate the fractional TPC (i.e., the weighting factor ($\alpha_{\_shortTTI}$) is smaller than 1).

<An Accumulation Value of TPC Commands>

In the present embodiment, correction values of TPC commands used for determining the transmission power of the PUSCH will be described in detail. As mentioned above, the correction value of the TPC command may be an accumulation value of the TPC commands included in the DCI. The accumulation value of the TPC commands may be calculated for each TTI length, or may be calculated commonly regardless of the TTI length.

FIGS. 7A and 7B are diagrams showing an example of calculating an accumulation value of TPC commands according to the present embodiment. Note that steps S201 and S301 in FIGS. 7A and 7B are the same as step S101 in FIG. 6, so that the description is omitted. Note that step S301 in FIG. 7B may be omitted.

FIG. 7A shows the case where a correction value of a TPC command is an accumulation value of TPC commands calculated for each TTI length. As shown in FIG. 7A, in the case of transmitting the PUSCH in the normal TTI, the user terminal calculates an accumulation value (f) of the TPC commands, for example, using the formula (2) (step S202). In formula (2), the accumulation value ($f_c(i)$) of the sub-frame i of the cell c is calculated by an accumulation value ($f_c(i-1)$) in the sub-frame $i-1$ and a TPC command value ($\delta_{PUSCH,c}(i-K_{PUSCH})$) in the sub-frame $i-K_{PUSCH}$ (for example, $K_{PUSCH}=4$).

On the other hand, in the case of transmitting the PUSCH in the shortened TTI, the user terminal calculates an accumulation value of TPC commands for the shortened TTI, apart from the accumulation value of the TPC commands for the normal TTI (step S203). For example, the accumulation value ($f_c(i)$, $f_c(i-1)$) in the formula (2) may be changed to the accumulation value ($f_{shortTTI}(i)$, $f_{shortTTI}(i-1)$) for the shortened TTI.

As shown in FIG. 7A, in the case of calculating the accumulation value of the TPC commands for each TTI length, it is possible to apply transmission power control different according to the TTI length. In the case shown in FIG. 7A, the individual parameter individually set for the normal TTI and the shortened TTI may include a correction value (accumulation value) by the TPC command.

FIG. 7B shows the case where the correction value (f) of the TPC command is the accumulation value of the TPC commands commonly calculated regardless of the TTI length. In the case shown in FIG. 7B, also in the case where the user terminal transmits the PUSCH in one of the normal TTI and the shortened TTI, an accumulation value (f) of TPC commands common to other normal TTI and shortened TTI is calculated for example, using the formula (2) (step S302).

As shown in FIG. 7B, in the case of calculating the accumulation value of the TPC commands commonly to all the TTI lengths, even in the case where the TTI length is abruptly switched, transmission power can be determined based on the accumulation value before the switching, and thus the transmission power of the PUSCH can be maintained properly.

<Others>

Note that, in the present embodiment, the TTI lengths used for transmitting the PUSCH may be semi-statically set by higher layer signaling such as RRC signaling, or may be dynamically set by L1/L2 control signals (for example, instruction information included in DCI).

Alternatively, the TTI length used for transmitting the PUSCH may be implicitly set. For example, a handover procedure or a random access procedure occurs in a state where the shortened TTI is set, the user terminal may switch the TTI length used for transmitting the PUSCH from the shortened TTI to the normal TTI without explicit re-setting or signaling from the radio base station.

Moreover, the user terminal may autonomously set the shortened TTI based on at least one of a frequency band, a system bandwidth, whether or not listening (LBT: Listen Before Talk) in an unlicensed band (LAA: License Assisted Access) is applied, the type of data (for example, control data, voice or the like), a logical channel, a transport block, RLC (Radio Link Control) mode, C-RNTI (Cell-Radio Network Temporary Identifier), and the like.

Moreover, in the present embodiment, the DMRS sequence and/or hopping pattern may be changed according to the TTI length. Specifically, the user terminal may determine the DMRS sequence and/or hopping pattern using a different cell ID for each TTI length.

For example, in the case of transmitting the PUSCH in the normal TTI, the user terminal may determine the DMRS sequence and/or hopping pattern based on a physical layer cell ID ($N^{CELL}_{ID}$), and in the case of transmitting the PUSCH in the shortened TTI, may determine the DMRS sequence and/or hopping pattern based on a virtual cell ID. Accordingly, in the shortened TTI, in order to ensure reception quality, a cooperative reception (CoMP: Coordinated Multi-Point) may be performed in a plurality of radio base stations with a virtual cell ID common to the plurality of radio base stations, and in the normal TTI, a reception Non-CoMP) may be performed only in the closest radio base station.

Moreover, the transmission power control of the PUSCH according to the present embodiment may be applied to other uplink signals such as SRS. For example, the user terminal may control the transmission power of the SRS based on the individual parameter and/or the common parameter.

(Radio Communication System)

Hereinafter, a configuration of a radio communication system according to an embodiment of the present invention will be described. In the radio communication system, the radio communication methods according to the respective aspects are applied. Note that the radio communication methods according to the respective aspects may be applied alone, or may be applied in combination.

Figure 8:
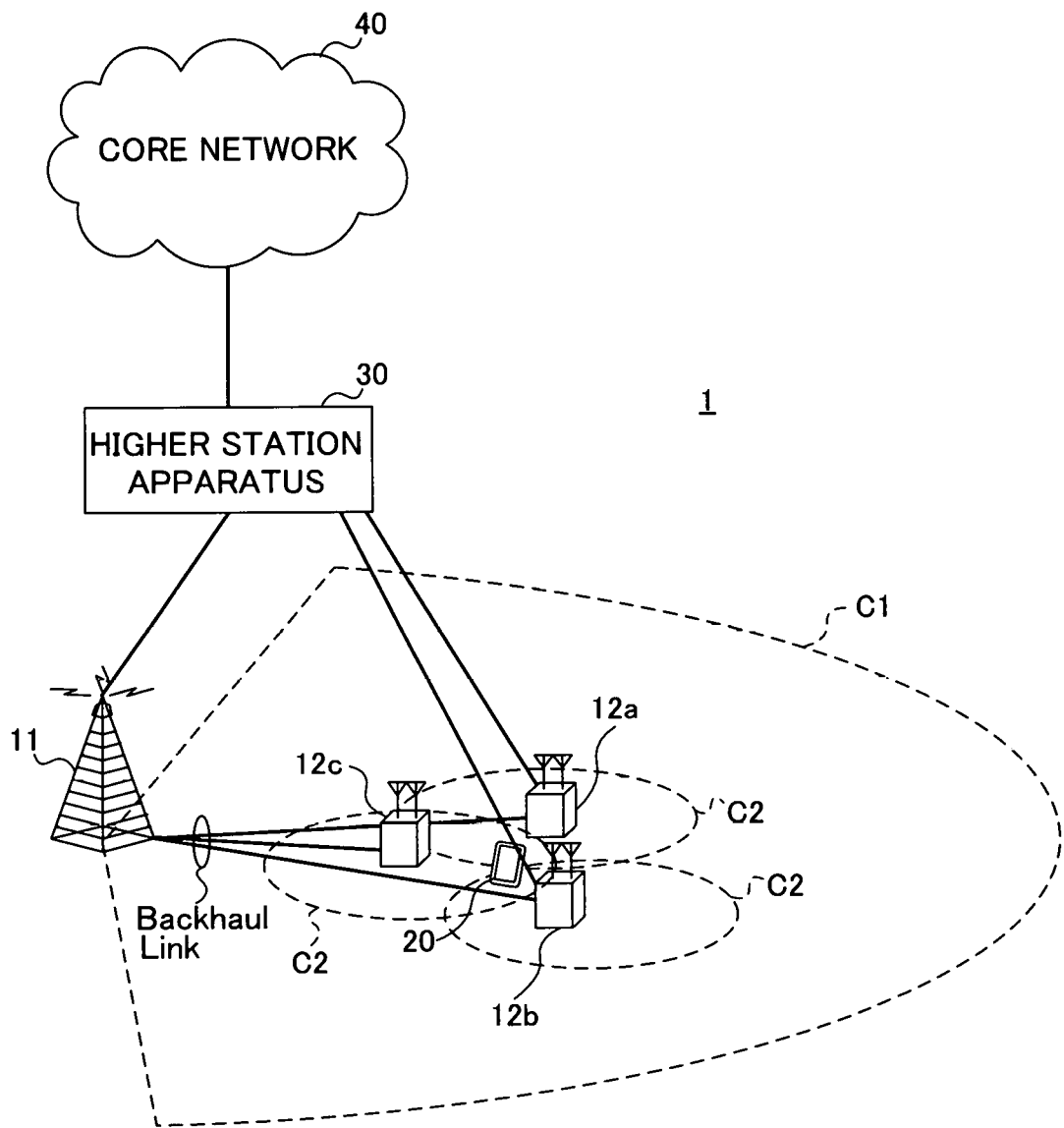
FIG. 8 is a diagram showing an exemplary schematic configuration of a radio communication system according to the present embodiment.

FIG. 8 is a diagram showing an exemplary schematic configuration of the radio communication system according to the present embodiment. A radio communication system 1 can employ carrier aggregation (CA) and/or dual connectivity (DC) to aggregate a plurality of base frequency blocks (component carriers) with a system bandwidth (e.g., 20 MHz) of the LTE system as one unit. The radio communication system 1 may be called SUPER 3G, LTE-A (LTE-Advanced), IMT-Advanced, 4G, 5G, FRA (Future Radio Access), or the like.

The radio communication system 1 as shown in FIG. 8 includes a radio base station 11 that forms a macro cell C1, and radio base stations 12a to 12c which are disposed in the macro cell C1 and each of which forms a small cell C2 smaller than the macro cell C1. Moreover, the user terminal 20 is disposed in the macro cell C1 and each of the small cells C2.

The user terminal 20 is capable of connecting to both of the radio base station 11 and the radio base station 12. It is assumed that the user terminal 20 concurrently uses the macro cell C1 and the small cell C2 using different frequencies by CA or DC. Moreover, the user terminal 20 can employ CA or DC using a plurality of cells (CC) (e.g., 6 or more CCs).

Between the user terminal 20 and the radio base station 11, communication can be carried out using a carrier of a relatively low frequency band (e.g., 2 GHz) and a narrow bandwidth (referred to as, for example, "existing carrier", "legacy carrier" and so on). Meanwhile, between the user terminal 20 and the radio base station 12, a carrier of a relatively high frequency band (for example, 3.5 GHz, 5 GHz and so on) and a wide bandwidth may be used, or the same carrier as that used between the user terminal 20 and the radio base station 11 may be used. Note that, the configuration of the frequency band used by each radio base station is not limited to this.

The connection between the radio base station 11 and the radio base stations 12 (or between two radio base stations 12) can be configured by wired connection (e.g., optical fiber conforming to CPRI (Common Public Radio Interface), X2 interface, or the like) or wireless connection.

The radio base station 11 and the radio base stations 12 are each connected with a higher station apparatus 30, and connected with a core network 40 via the higher station apparatus 30. The higher station apparatus 30 includes, but not limited to, for example, an access gateway device, a radio network controller (RNC), a mobility management entity (MME) and so on. Moreover, each of the radio base stations 12 may be connected with the higher station apparatus 30 via the radio base station 11.

Note that the radio base station 11 is a radio base station having a relatively wide coverage, and may be referred to as a macro base station, an aggregate node, an eNB (eNodeB), a transmitting/receiving point and so on. Also, the radio base station 12 is a radio base station having a local coverage, and may be referred to as a small base station, a micro base station, a pico base station, a Femto base station, an HeNB (Home eNodeB), an RRH (Remote Radio Head), a transmitting/receiving point, and so on. Hereinafter, in the case of not distinguishing between the radio base stations 11 and 12, they are collectively referred to as "radio base stations 10".

Each user terminal 20 is a terminal supporting various types of communication schemes such as LTE and LTE-A, and may include a fixed communication terminal as well as a mobile communication terminal.

In the radio communication system 1, as radio access schemes, OFDMA (Orthogonal Frequency Division Multiple Access) is applied on downlink, while SC-FDMA (Single Carrier-Frequency Division Multiple Access) is applied on uplink. OFDMA is a multicarrier transmission scheme for dividing a frequency band into a plurality of narrow frequency bands (subcarriers), and mapping data to each subcarrier to perform communication. SC-FDMA is a single-carrier transmission scheme for dividing a system bandwidth into bands comprised of a single or contiguous resource blocks for each terminal so that a plurality of terminals uses mutually different bands, and thereby reducing interference among the terminals. The uplink and downlink radio access schemes are not limited to a combination thereof, and the OFDMA may be used on uplink.

In the radio communication system 1, a downlink shared channel (PDSCH: Physical Downlink Shared Channel), which is shared by each user terminal 20, a Broadcast channel (PBCH: Physical Broadcast Channel), a downlink L1/L2 control channel and so on are used as downlink channels. User data and higher layer control information, SIB (System Information Block) and so on are transmitted on the PDSCH. Moreover, MIB (Master Information Block) is transmitted on the PBCH.

The downlink L1/L2 control channel includes a downlink control channel (PDCCH (Physical Downlink Control Channel), EPDCCH (Enhanced Physical Downlink Control Channel)), PCFICH (Physical Control Format Indicator Channel), PHICH (Physical Hybrid-ARQ Indicator Channel), and so on. The downlink control information (DCI) including scheduling information of the PDSCH and PUSCH and so on are transmitted on the PDCCH. The number of OFDM symbols used in the PDCCH is transmitted on the PCFICH. The receipt confirmation information (ACK/NACK) of HARQ for PUSCH is transmitted on the PHICH. The EPDCCH is frequency division multiplexed with the PDSCH (downlink shared data channel), and used for transmission of the DCI and the like, like the PDCCH.

In the radio communication system 1, an uplink shared channel (PUSCH: Physical Uplink Shared Channel) that is shared by each user terminal 20, an uplink control channel (PUCCH: Physical Uplink Control Channel), a random access channel (PRACH: Physical Random Access Channel) and so on are used as uplink channels. User data and higher layer control information are transmitted on the PUSCH. Uplink control information (UCI) which includes as least one of receipt confirmation information (ACK/NACK), radio quality information (CQI), and so on is transmitted on the PUSCH or PUCCH. A random access preamble to establish connection with a cell is transmitted on the PRACH.

<Radio Base Station>

Figure 9:
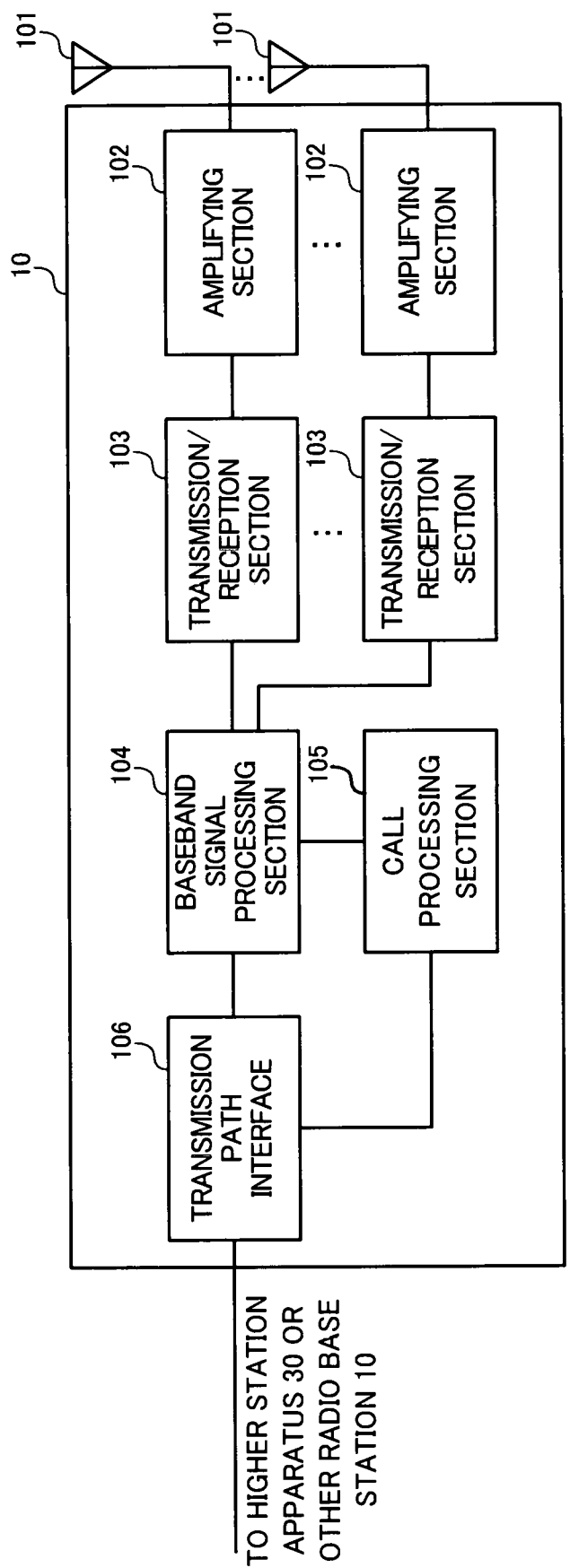
FIG. 9 is a diagram showing an exemplary overall configuration of a radio base station according to the present embodiment.

FIG. 9 is a diagram showing an exemplary overall configuration of the radio base station according to the present embodiment. The radio base station 10 includes a plurality of transmission/reception antennas 101, amplifying sections 102, transmission/reception sections 103, a baseband signal processing section 104, a call processing section 105, and a transmission path interface 106. Note that, the radio base station 10 may be configured to include one or more transmission/reception antennas 101, one or more amplifying sections 102, and one or more transmission/reception sections 103.

User data transmitted from the radio base station 10 to the user terminal 20 on downlink is input to the baseband signal processing section 104 from the higher station apparatus 30 via the transmission path interface 106.

The baseband signal processing section 104 performs, on the user data, processing of PDCP (Packet Data Convergence Protocol) layer, segmentation and concatenation of the user data, transmission processing of RLC (Radio Link Control) layer such as RLC retransmission control, MAC (Medium Access Control) retransmission control (for example, transmission processing of HARQ (Hybrid Automatic Repeat reQuest)), scheduling, transmission format selection, channel coding, Inverse Fast Fourier Transform (IFFT) processing, and precoding processing to transfer the resultant user data to each of the transmission/reception sections 103. Moreover, the baseband signal processing section 104 performs, also on the downlink control signal, transmission processing such as channel coding and Inverse Fast Fourier Transform to transfer the resultant downlink control signal to each of the transmission/reception sections 103.

Each of the transmission/reception sections 103 converts the baseband signal, which is subjected to precoding for each antenna and is output from the baseband signal processing section 104, into a signal with a radio frequency band and transmits the signal. The radio frequency signal frequency-converted in the transmission/reception sections 103 is amplified in the amplifying sections 102, and transmitted from the transmission/reception antennas 101.

The transmission/reception section 103 can comprise a transmitter/receiver, a transmission/reception circuit or a transmission/reception apparatus described on the basis of common recognition in the technical field of the present invention. The transmission/reception sections 103 may be configured as an integrated transmission/reception section, or may comprise a transmission section and a reception section.

On the other hand, as for uplink signals, radio frequency signals that are received by the transmission/reception antennas 101 are amplified in the amplifying sections 102. The transmission/reception sections 103 receive the uplink signals amplified in the amplifying sections 102. Each of the transmission/reception sections 103 frequency-converts the received signals into baseband signals, and outputs the baseband signals to the baseband signal processing section 104.

Moreover, the transmission/reception section 103 receives uplink signals in the normal TTI (first TTI) and/or the shortened TTI (second TTI). Specifically, the transmission/reception section 103 receives at least one of the PUSCH, PUCCH, DMRS, and SRS in the normal TTI and/or the shortened TTI.

Moreover, the transmission/reception section 103 transmits parameters used for control of transmission power of the uplink signal. Specifically, the transmission/reception section 103 transmits the individual parameter and/or common parameter (hereinafter, referred to as individual parameter/common parameter), and/or information used for setting the individual parameter/common parameter.

The baseband signal processing section 104 performs, on user data included in the input uplink signal, Fast Fourier Transform (FFT) processing, Inverse Discrete Fourier Transform (IDFT) Processing, error correction decoding, reception processing of MAC retransmission control, and reception processing of RLC layer and PDCP layer to transfer the resultant user data to the higher station apparatus 30 via the transmission path interface 106. The call processing section 105 performs call processing such as setting and release of a communication channel, state management of the radio base station 10, and management of radio resources.

The transmission path interface 106 transmits and receives signals to and from the higher station apparatus 30 via a predetermined interface. Moreover, the transmission path interface 106 may transmit and receive signals to and from the adjacent radio base station 10 (backhaul signaling) via an inter-base station interface (e.g., optical fiber conforming to CPRI (Common Public Radio Interface), or X2 interface).

Figure 10:
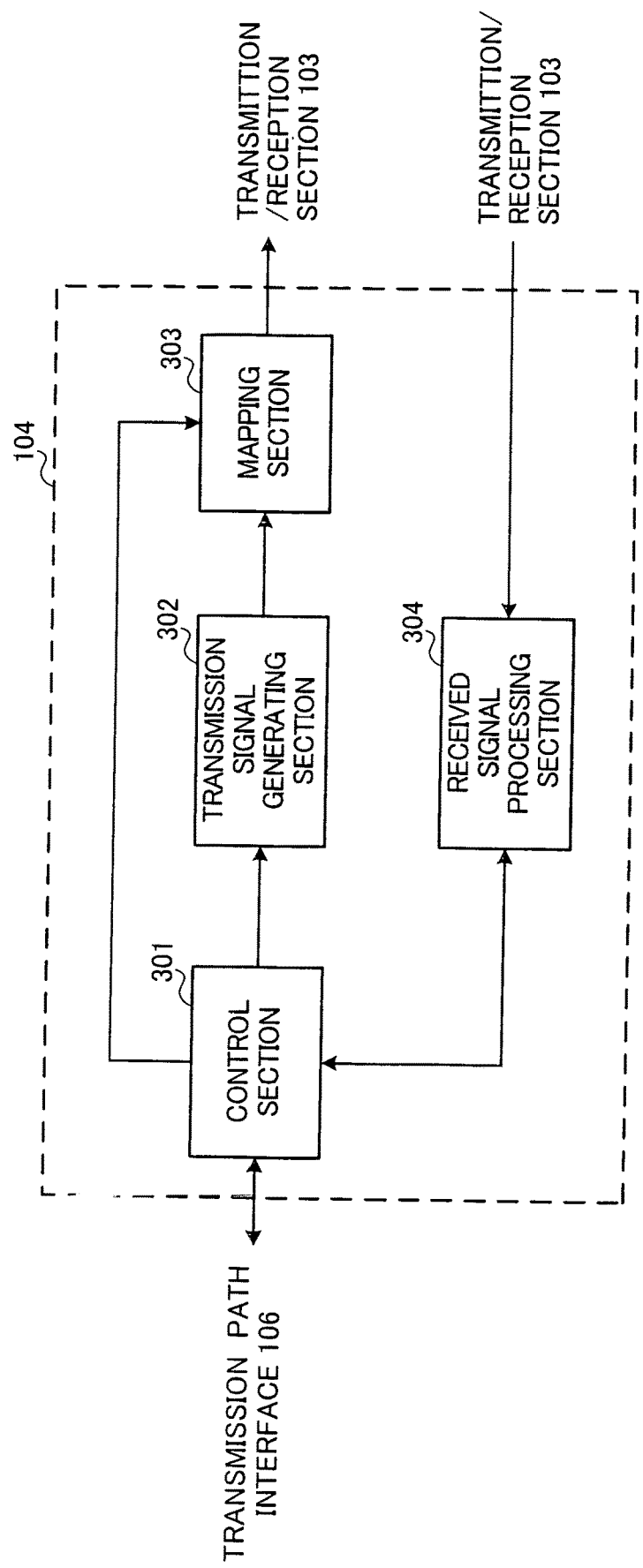
FIG. 10 is a diagram showing an exemplary function configuration of the radio base station according to the present embodiment.

FIG. 10 is a diagram showing an exemplary function configuration of the radio base station according to the present embodiment. Note that, FIG. 10 mainly illustrates functional blocks of a characteristic portion in this embodiment, and it is assumed that the radio base station 10 has other functional blocks required for radio communication. As shown in FIG. 10, the baseband signal processing section 104 includes a control section 301, a transmission signal generating section 302, a mapping section 303, and a received signal processing section 304.

The control section 301 executes control of the entire radio base station 10. The control section 301 controls, for example, downlink signal generation by the transmission signal generating section 302, signal mapping by the mapping section 303, and signal reception processing by the received signal processing section 304.

Specifically, the control section 301 performs transmission control (for example, control of modulation scheme, coding rates, resource assignments (scheduling) and the like) of downlink (DL) signals based on Channel State Information (CSI) reported from the user terminal 20.

Moreover, the control section 301 controls Transmission Time Interval (TTI) used for reception of downlink signals and/or transmission of uplink signals. The control section 301 sets the normal TTI of 1 ms or/and the shortened TTI shorter than the normal TTI. The configuration examples of the shortened TTI are as described with reference to FIG. 2. The control section 301 may instruct the user terminal 20 to set the shortened TTI with (1) an implicit notification, or an explicit notification by at least one of (2) RRC signaling, (3) MAC signaling, and (4) physical layer signaling.

Moreover, the control section 301 sets parameters used for controlling the transmission power of the uplink signals. Specifically, the control section 301 sets the individual parameter/common parameter and/or information used for setting the individual parameter/common parameter.

For example, the control section 301 may set, as the individual parameters, a weighting factor ($\alpha$) of the fractional TPC for the normal TTI, a weighting factor ($\alpha_{\_shortTTI}$) of the fractional TPC for the shortened TTI, and information used for setting a target received power parameter for the normal TTI ($P_{0\_PUSCH}$) and a target received power parameter ($P_{0\_PUSCH\_shortTTI}$) for the shortened TTI.

Here, the control section 301 may set the weighting factor ($\alpha$) for the normal TTI to be smaller than 1 and validate the fractional TPC. The control section 301 may set the weighting factor ($\alpha_{\_shortTTI}$) for the normal TTI to a value (e.g., 1) larger than the weighting factor ($\alpha$) for the normal TTI. Setting the weighting factor ($\alpha_{\_shortTTI}$) to 1 makes it possible to invalidate the fractional TPC.

Moreover, the control section 301 may set, as the common parameters, the maximum transmission power of the user terminal 20 ($P_{CMAX}$), the transmission bandwidth of the PUSCH ($M_{PUSCH}$), information used for calculating the path-loss (PL) in the user terminal 20 (transmission power of reference signals), an offset ($\Delta_{TF}$) based on MCS or information used for calculating the offset, and a TPC command.

The control section 301 can comprise a controller, a control circuit or a control apparatus described on the basis of common recognition in the technical field of the present invention.

The transmission signal generating section 302 generates, based on commands from the control section 301, downlink signals (including a downlink data signal, a downlink control signal, and a downlink reference signal) to output the downlink signals to the mapping section 303. Specifically, the transmission signal generating section 302 generates downlink data signals (PDSCH) including broadcast information, notification information by the above-mentioned higher layer signaling (UE-specific control information) and user data to output the downlink data signals to the mapping section 303. Moreover, the transmission signal generating section 302 generates downlink control signals (PDCCH/EPDCCH) including the above-mentioned DCI to output the downlink control signals to the mapping section 303. Moreover, the transmission signal generating section 302 generates downlink reference signals such as CRS and CSI-RS to output the downlink reference signals to the mapping section 303.

The transmission signal generating section 302 may be a signal generator, a signal generating circuit or a signal generating apparatus described on the basis of common recognition in the technical field of the present invention.

The mapping section 303 maps, based on commands from the control section 301, a downlink signal generated in the transmission signal generating section 302 to a predetermined radio resource to output the downlink signal to the transmission/reception sections 103. The mapping section 303 may be a mapper, a mapping circuit or a mapping apparatus described on the basis of common recognition in the technical field of the present invention.

The received signal processing section 304 performs reception processing (e.g., demapping, demodulation, decoding or the like) on uplink signals transmitted from the user terminal 20. Specifically, the received signal processing section 304 demodulates the PUSCH in the normal TTI and/or the shortened TTI using the DMRS received in the normal TTI and/or the shortened TTI. The processing results are output to the control section 301.

The received signal processing section 304 can comprise a signal processor, a signal processing circuit or a signal processing apparatus, as well as a measure, a measurement circuit or a measurement apparatus described on the basis of common recognition in the technical field of the present invention.

<User Terminal>

Figure 11:
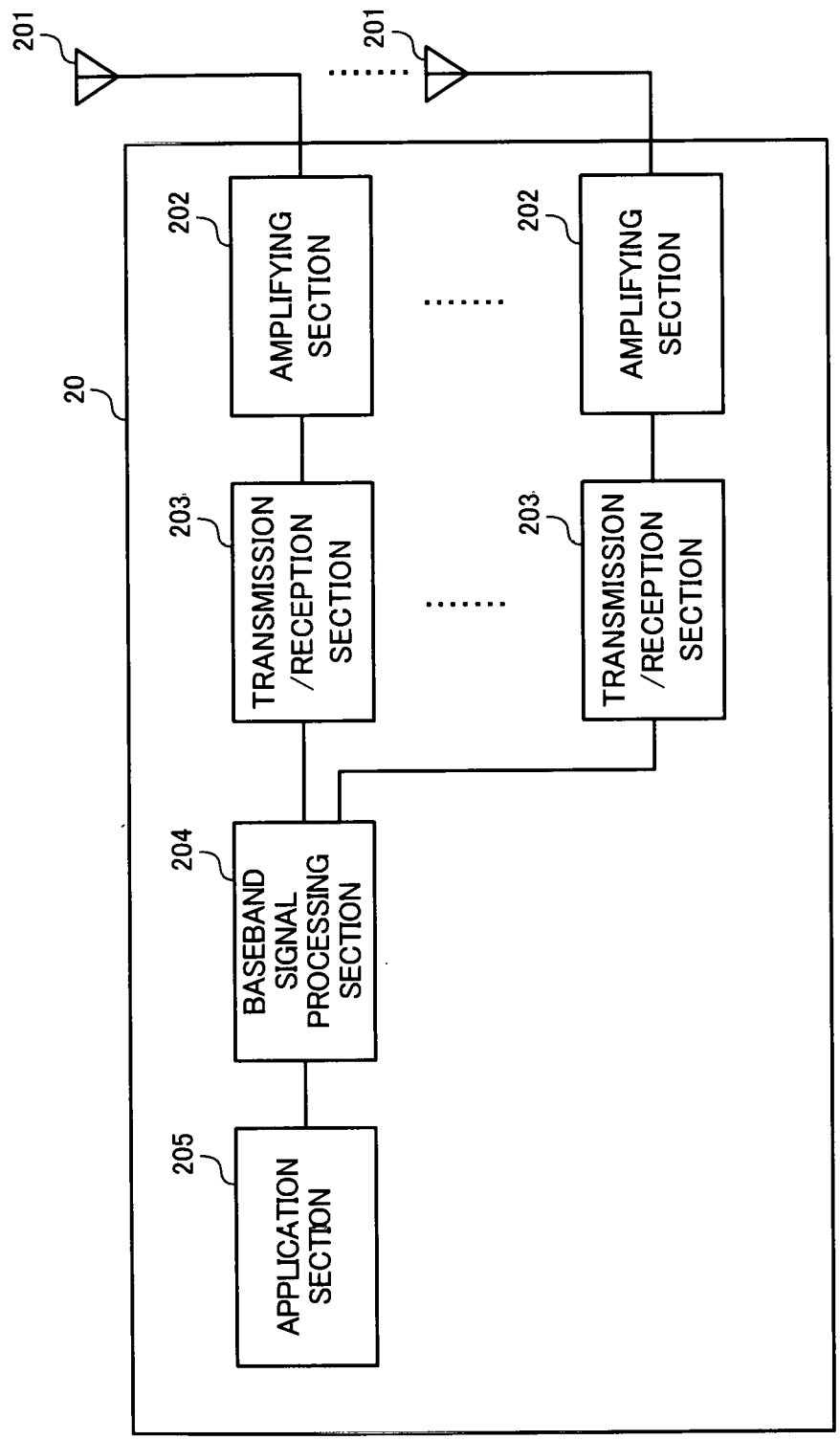
FIG. 11 is a diagram showing an exemplary overall configuration of a user terminal according to the present embodiment.

FIG. 11 is a diagram showing an overall configuration example of the user terminal according to the present embodiment. The user terminal 20 includes a plurality of transmission/reception antennas 201 for MIMO transmission, amplifying sections 202, transmission/reception sections 203, a baseband signal processing section 204, and an application section 205.

The radio frequency signals received by the plurality of transmission/reception antennas 201 are each amplified in the amplifying sections 202. Each of the transmission/reception sections 203 receives the downlink signals amplified in the amplifying sections 202. Each of the transmission/reception sections 203 frequency-converts the received signal into a baseband signal, and outputs the baseband signal to the baseband signal processing section 204.

The baseband signal processing section 204 performs FFT processing, reception processing, such as Error correction decoding and retransmission control, etc., on the input baseband signal. Downlink data (user data) is transferred to the application section 205. The application section 205 performs processing concerning layers higher than a physical layer and a MAC layer, and the like. Moreover, among the downlink data, broadcast information is also transferred to the application section 205.

On the other hand, as for uplink data, the data is input to the baseband signal processing section 204 from the application section 205. The baseband signal processing section 204 performs transmission processing of retransmission control (e.g., transmission processing of HARQ), channel coding, rate matching, puncture, Discrete Fourier Transform (DFT) Processing, IFFT Processing and the like to transfer the resultant uplink data to each of the transmission/reception sections 203. The baseband signal processing section 204 performs, also on the UCI, channel coding, rate matching, puncture, DFT processing, IFFT processing and the like to transfer the resultant UCI to each of the transmission/reception sections 203.

Each of the transmission/reception sections 203 converts the baseband signal output from the baseband signal processing section 204 into a signal with a radio frequency band to transmit the signal. The radio frequency signals frequency-converted in the transmission/reception sections 203 are amplified in each of the amplifying sections 202, and transmitted from the transmission/reception antennas 201.

Moreover, the transmission/reception sections 203 transmit uplink signals in the normal TTI (first TTI) and/or shortened TTI (second TTI). Specifically, the transmission/reception sections 103 transmit at least one of the PUSCH, PUCCH, DMRS, and SRS in the normal TTI and/or the shortened TTI.

Moreover, the transmission/reception sections 203 receive parameters used for controlling the transmission power of the uplink signal. Specifically, the transmission/reception sections 203 receive the individual parameter/common parameter and/or information used for setting the individual parameter/common parameter.

The transmission/reception sections 203 may be a transmitter/receiver, a transmission/reception circuit or a transmission/reception apparatus described on the basis of common recognition in the technical field of the present invention. Moreover, the transmission/reception sections 203 may be configured as an integrated transmission/reception section, or may comprise a transmission section and a reception section.

Figure 12:
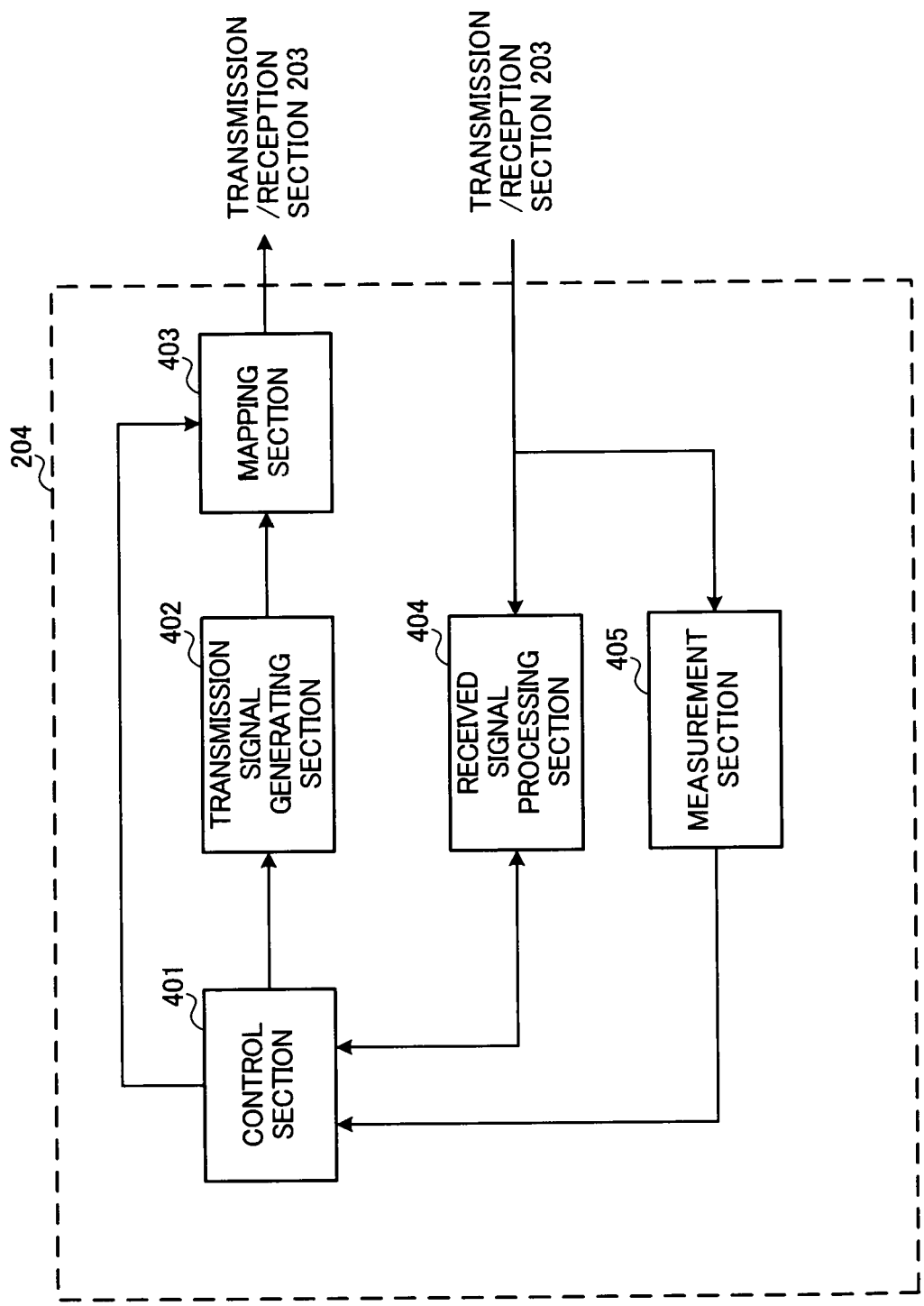
FIG. 12 is a diagram showing an exemplary function configuration of the user terminal according to the present embodiment.

FIG. 12 is a diagram showing an exemplary function configuration of the user terminal according to the present embodiment. Note that, FIG. 12 mainly illustrates functional blocks of a characteristic portion in this embodiment, and it is assumed that the user terminal 20 also has other functional blocks required for radio communication. As shown in FIG. 12, the baseband signal processing section 204 of the user terminal 20 includes a control section 401, a transmission signal generating section 402, a mapping section 403, a received signal processing section 404, and a measurement section 405.

The control section 401 executes control of the entire user terminal 20. The control section 401 controls, for example, signal generation by the transmission signal generating section 402, signal mapping by the mapping section 403, and signal reception processing by the received signal processing section 404.

Moreover, the control section 401 controls Transmission Time Interval (TTI) used for reception of the downlink (DL) signals and/or transmission of the uplink (UL) signals. The control section 301 sets the normal TTI of 1 ms or/and the shortened TTI shorter than the normal TTI. The configuration example of the shortened TTI is as described with reference to FIG. 2. The control section 401 may set (detect) the shortened TTI based on (1) an implicit notification, or an explicit notification by at least one of (2) RRC signaling, (3) MAC signaling, and (4) physical layer signaling from the radio base station 10.

Moreover, the control section 401 controls the transmission power of the uplink signal. Specifically, the control section 401 controls the transmission power of the PUSCH based on individual parameters (individually set for the normal TTI and the shortened TTI) set according to the TTI length for transmitting the PUSCH. Moreover, the control section 401 may control the transmission power of the PUSCH based on common parameters set regardless of the TTI length for transmitting the PUSCH (commonly set for the normal TTI and the shortened TTI) in addition to the individual parameters. Note that, the control section 401 may control the transmission power of the SRS using the individual parameters/common parameters.

For example, in the case of transmitting the PUSCH in the normal TTI, the control section 401 may determine the transmission power of the PUSCH based on the individual parameters for the normal TTI (for example, the weighting factor ($\alpha$) of the fractional TPC and the target received power parameter ($P_{0\_PUSCH}$)), and the common parameters (for example, the maximum transmission power ($P_{CMAX}$), transmission bandwidth of PUSCH ($M_{PUSCH}$), path-loss (PL), offset ($\Delta_{TF}$) based on the MCS and correction value (f) by the TPC command).

In this case, the control section 401 may determine the transmission power of the PUSCH in the normal TTI using the formula (1). Moreover, in the case of using the accumulation value of the TPC commands as the correction value (f) of the TPC command, the control section 401 may calculate the accumulation value (f) of the TPC commands using the formula (2).

Moreover, in the case of transmitting the PUSCH in the shortened TTI, the control section 401 may determine the transmission power of the PUSCH based on the individual parameters for the shortened TTI (for example, the weighting factor of the fractional TPC ($\alpha_{\_shortTTI}$) and target received power parameter ($P_{0\_PUSCH\_shortTTI}$)), and the common parameters (for example, the maximum transmission power ($P_{CMAX}$), transmission bandwidth of PUSCH ($M_{PUSCH}$), path-loss (PL), offset ($\Delta_{TF}$) based on the MCS and correction value (f) by the TPC command).

In this case, the control section 401 may change the individual parameters for the normal TTI in the formula (1) (for example, the weighting factor ($\alpha$) of the fractional TPC for the normal TTI and the target received power parameter ($P_{0\_PUSCH}$)) to the individual parameters for the shortened TTI (for example, the weighting factor ($\alpha_{\_shortTTI}$) of the fractional TPC and the target received power parameter ($P_{0\_PUSCH\_shortTTI}$)), and determine the transmission power of the PUSCH in the shortened TTI. Moreover, in the case of using the accumulation value of the TPC commands as the correction value of the TPC command, the control section 401 may calculate the accumulation value (f) of the TPC commands common to the normal TTI using the formula (2), or may change the formula (2) and calculate the accumulation value of the TPC commands for the shortened TTI ($f_{\_shortTTI}$).

Moreover, the control section 401 may determine the DMRS sequence and/or hopping pattern based on different cell IDs between the normal TTI and the shortened TTI, and instruct the transmission signal generating section 402 to generate the DMRS using the sequence and/or hopping pattern.

Moreover, in the case where the PUSCH is transmitted in the shortened TTI, the control section 401 may control the transmission signal generating section 402 and/or the mapping section 403 to multiplex the DMRS with a symbol used in common for the shortened TTI and other shortened TTI. For example, the control section 401 may control the transmission signal generating section 402 to generate the DMRS using different CS indexes between a plurality of shortened TTIs. Moreover, the control section 401 may control the mapping section 403 to assign the DMRSs to different Combs between a plurality of shortened TTIs.

The control section 401 can comprise a controller, a control circuit or a control apparatus described on the basis of common recognition in the technical field of the present invention.

The transmission signal generating section 402 generates (e.g., coding, rate matching, puncture, and modulation, etc.) uplink signals (e.g., PUSCH, PUCCH, DMRS, and SRS) based on commands from the control section 401 to output the uplink signals to the mapping section 403. Specifically, the transmission signal generating section 402 generates the DMRS for demodulating the PUSCH transmitted in the normal TTI and/or the shortened TTI based on commands from the control section 401.

The transmission signal generating section 402 may be a signal generator, a signal generating circuit or a signal generating apparatus described on the basis of common recognition in the technical field of the present invention.

The mapping section 403 maps the uplink signals (for example, PUSCH, PUCCH, DMRS, and SRS) generated in the transmission signal generating section 402 to radio resources (for example, PRB, subcarrier, or Comb) based on commands from the control section 401 to output the uplink signals to the transmission/reception section 203.

The received signal processing section 404 performs reception processing (for example, demapping, demodulation, decoding, etc.) on the downlink signals (including a downlink control signal, a downlink data signal, and a downlink reference signal). The received signal processing section 404 outputs information received from the radio base station 10 to the control section 401. The received signal processing section 404 outputs, for example, broadcast information, system information, control information (UE-specific control information) by higher layer signaling such as RRC signaling, DCI and the like to the control section 401.

The received signal processing section 404 can comprise a signal processor, a signal processing circuit or a signal processing apparatus described on the basis of common recognition in the technical field of the present invention.

Moreover, the received signal processing section 404 can constitute the reception section according to the present invention.

The measurement section 405 measures channel state based on a reference signal (e.g., CSI-RS) from the radio base station 10, and outputs the measurement result to the control section 401. Note that the measurement of the channel state may be performed for each CC.

The measurement section 405 can comprise a signal processor, a signal processing circuit or a signal processing apparatus as well as a measure, a measurement circuit or a measurement apparatus described on the basis of common recognition in the technical field of the present invention.

<Hardware Configuration>

The block diagrams used in the description of the above embodiment indicate blocks of function units. These functional blocks (units) are realized by an arbitrary combination of hardware and/or software. Moreover, there are no specific limitations on means for realizing the functional blocks. That is, the functional blocks may be realized by a physically combined device, or realized by two or more physically separated devices which are connected in a wired or wireless manner.

Figure 13:
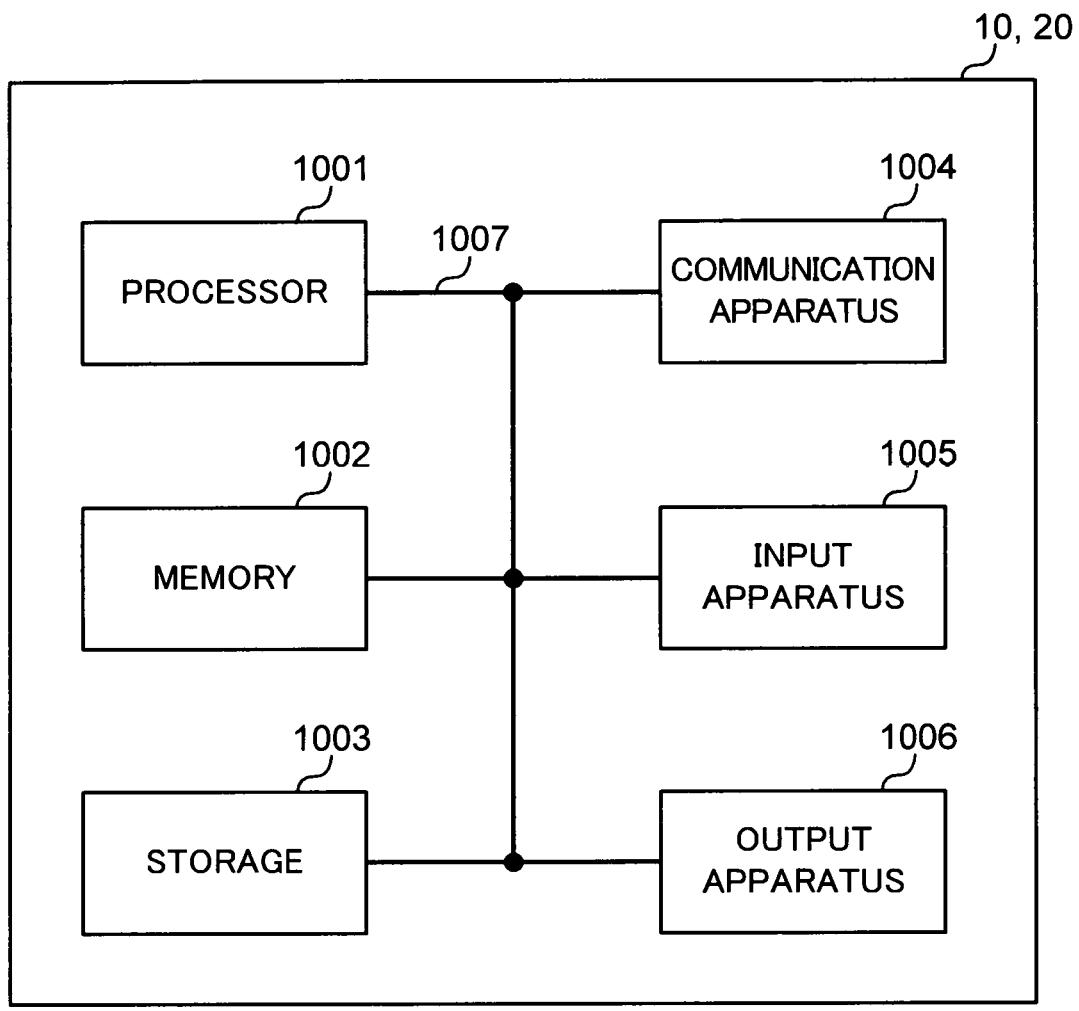
FIG. 13 is a diagram showing an exemplary hardware configuration of the radio base station and the user terminal according to the present embodiment.

For example, the radio base station, the user terminal and the like in the present embodiment may function as a computer that performs processing of the radio communication method of the present invention. FIG. 13 is a diagram showing an exemplary hardware configuration of the radio base station and the user terminal according to the present embodiment. The above-mentioned radio base station 10 and user terminal 20 may be physically configured as a computer apparatus which includes a processor 1001, a memory 1002, a storage 1003, a communication apparatus 1004, an input apparatus 1005, an output apparatus 1006, a bus 1007, and the like.

In the following description, the term "apparatus" can be read as a circuit, device, unit, or the like. The hardware configuration of the radio base station 10 and the user terminal 20 may be configured to include each apparatus illustrated in the drawings singularly or in plural, or may be configured not to include a part of the apparatus.

The functions in the radio base station 10 and the user terminal 20 are implemented such that predetermined software (program) is read onto hardware, such as the processor 1001 and the memory 1002, and thereby the processor 1001 performs operation and controls communication by the communication apparatus 1004 and reading and/or writing of data in the memory 1002 and the storage 1003.

The processor 1001 operates, for example, an operating system to control the entire computer. The processor 1001 may be constituted by a central processing unit (CPU) which includes an interface with a peripheral apparatus, a control apparatus, an operation apparatus, a register and the like. For example, the above-described baseband signal processing section 104 (204), the call processing section 105 and the like may be realized by the processor 1001.

Moreover, the processor 1001 reads a program (program code), a software module and data from the storage 1003 and/or the communication apparatus 1004 to the memory 1002 and executes various processing according to these. As the program, a program is used which causes a computer to execute at least a part of operations described in the above-mentioned embodiment. For example, the control section 401 of the user terminal 20 may be realized by a control program which is stored in the memory 1002 and operated by the processor 1001, and other functional blocks may be also realized similarly.

The memory 1002 is a computer readable recording medium, and may be constituted by at least one of, for example, ROM (Read Only Memory), EPROM (Erasable Programmable ROM), RAM (Random Access Memory) and the like. The memory 1002 may be referred to as a register, a cache, a main memory (primary memory), or the like. The memory 1002 can store executable programs (program codes), software modules, and the like for implementing the radio communication method according to the present embodiment.

The storage 1003 is a computer readable recording medium and may be constituted by at least one of, for example, an optical disk, such as a CD-ROM (Compact Disc ROM), a hard disk drive, a flexible disk, a magneto-optical disk, a flash memory and the like. The storage 1003 may be called an auxiliary storage apparatus.

The communication apparatus 1004 is hardware (transmission/reception device) for performing communication between computers via a wired and/or wireless network, and is also referred to as, for example, a network device, a network controller, a network card, a communication module or the like. For example, the above-described transmission/reception antennas 101 (201), amplifying sections 102 (202), transmission/reception section 103 (203), transmission path interface 106 and the like may be realized by the communication apparatus 1004.

The input apparatus 1005 is an input device (for example, keyboard, mouse, etc.) that accepts input from the outside. The output apparatus 1006 is an output device (for example, display, speaker, etc.) that performs output to the outside. Note that the input apparatus 1005 and the output apparatus 1006 may be an integrated component (for example, touch panel).

Moreover, the apparatuses such as the processor 1001 and the memory 1002 are connected by a bus 1007 for communicating information. The bus 1007 may be constituted by a single bus or different buses between the apparatuses.

Moreover, the radio base station 10 and the user terminal 20 may be configured to include hardware components, such as a microprocessor, ASIC (Application Specific Integrated Circuit), PLD (Programmable Logic Device), FPGA (Field Programmable Gate Array), and a part or all of the functional blocks may be implemented by the hardware. For example, the processor 1001 may be implemented by at least one of the hardware components.

The terms described herein and/or the terms required to understand the present description may be replaced with terms having the same or similar meanings. For example, the channel and/or symbol may be a signal (signaling). Moreover, the signal may be a message. Moreover, the component carrier (CC) may be referred to as a cell, frequency carrier, carrier frequency or the like.

Moreover, a radio frame may be constituted by one or more periods (frames) in the time domain. The one or more periods (frames) constituting the radio frame may be referred to as a sub-frame. Furthermore, the sub-frame may be constituted by one or more slots in the time domain. Furthermore, the slot may be constituted by one or more symbols (OFDM symbols, SC-FDMA symbols, etc.) in the time domain.

All of the radio frame, sub-frame, slot, and symbol represent the time unit when transmitting signals. The radio frame, sub-frame, slot and symbol may be referred to as other names corresponding to each. For example, 1 sub-frame may be referred to as a Transmission Time Interval (TTI), a plurality of consecutive sub-frames may be referred to as TTI, and one slot may be referred to as a TTI. That is, the sub-frame and the TTI may be a sub-frame (1 ms) in the existing LTE, a period shorter than 1 ms (e.g., 1 to 13 symbols), or a period longer than 1 ms.

Here, the TTI refers to, for example, the minimum time unit of scheduling in the radio communication. For example, in the LTE system, the radio base station performs scheduling for assigning radio resources (frequency bandwidth, transmission power and the like available in each user terminal) to each user terminal in the units of TTIs. The definition of TTI is not limited to this.

The resource block (RB) is the resource assignment unit in the time domain and the frequency domain, and may include one or more consecutive subcarriers in the frequency domain. Moreover, the RB may include one or more symbols in the time domain, and may have a length of one slot, one sub-frame or one TTI. One TTI and one sub-frame may be each constituted by one or more resource blocks. Note that the RB may be also referred to as a physical resource block (PRB: Physical RB), a PRB pair, an RB pair, or the like.

Moreover, the resource block may be constituted by one or more resource elements (REs). For example, one RE may be the radio resource domain of one subcarrier and one symbol.

The configuration of the above-described radio frame, sub-frame, slot and symbol is simply illustrative. For example, configurations such as the number of sub-frames included in the radio frame, the number of slots included in the sub-frame, the number of symbols and RBs included in the slot, the number of subcarriers included in the RB, the number of symbols within the TTI, a symbol length, and a cyclic prefix (CP) length may be changed variously.

Moreover, the information, parameter and the like described herein may be expressed by the absolute value, may be expressed by the relative value from the predetermined value, or may be expressed by another corresponding information. For example, the radio resource may be indicated by a predetermined index.

The information, signals, etc., described herein may be represented using any of a variety of different technologies. For example, data, instructions, commands, information, signals, bits, symbols, chips, etc., that may be mentioned throughout the above description, may be represented by voltages, currents, electromagnetic waves, magnetic fields or particles, optical fields or photons, or an arbitrary combination thereof.

Moreover, software, command, information and the like may be transmitted and received via a transmission medium. For example, in a case where the software is transmitted from a website, a server, or other remote sources by using wire technologies (coaxial cables, optical fiber cables, twisted pairs, digital subscriber lines (DSL) and the like) and/or wireless technologies (infrared, microwave, and the like), these wire technologies and/or wireless technologies are included within the definition of the transmission medium.

Moreover, the radio base station herein may be interpreted as a user terminal. For example, the aspects/embodiments of the present invention may be applied to a configuration in which communication between the radio base station and the user terminal is replaced with communication between a plurality of user terminals (D2D:Device-to-Device). In this case, the user terminal 20 may have the above-described functions of the radio base station 10. Moreover, the term such as "uplink" or "downlink" may be interpreted as the term "side". For example, an uplink channel may be interpreted as a side channel.

Similarly, the user terminal herein may be interpreted as the radio base station. In this case, the radio base station 10 may have the above-described functions of the user terminal 20.

The respective aspects/embodiments described herein may be used singularly or in combination, or may be used by being switched according to the execution. Moreover, the notification of predetermined information (for example, a notification of "being X") is not limited to being performed explicitly, but may be performed implicitly (for example, by not performing the notification of the predetermined information).

The notification of information is not limited to the aspects/embodiments described herein, but may be performed in other ways. For example, the notification of information may be performed by physical layer signaling (for example, DCI (Downlink Control Information), UCI (Uplink Control Information)), higher layer signaling (for example, RRC (Radio Resource Control) signaling, broadcast information (MIB (Master Information Block), SIB (System Information Block) or the like), MAC (Medium Access Control) signaling), other signals or a combination thereof. Moreover, RRC signaling may be referred to as RRC message, and may be, for example, RRC connection setup (RRCConnectionSetup) message, RRC connection reconfiguration (RRCConnectionReconfiguration) message, or the like. Also, MAC signaling may be notified, for example, by MAC control element (MAC CE (Control Element)).

The respective aspects/embodiments described herein may be applied to systems using LTE (Long Term Evolution), LTE-A (LTE-Advanced), LTE-B (LTE-Beyond), SUPER 3G, IMT-Advanced, 4G (4th generation mobile communication system), 5G (5th generation mobile communication system), FRA (Future Radio Access), New-RAT (Radio Access Technology), CDMA2000, UMB (Ultra Mobile Broadband), IEEE 802.11 (Wi-Fi Registered Trademark), IEEE 802.16 (WiMAX Registered Trademark), IEEE 802.20, UWB (Ultra-WideBand), Bluetooth (Registered Trademark), and other appropriate system and/or the next-generation system extended based thereon.

The order of processing procedures, sequences, flowcharts and the like in the respective aspects/embodiments as described herein may be interchanged, as long as there is no inconsistency. For example, in the method described herein, the elements of the various steps are presented in the exemplary order and are not limited to the specific order presented.

Now, although the present invention has been described in detail, it should be obvious to a person skilled in the art that the present invention is by no means limited to the embodiment described herein. For example, the respective embodiments described above may be used singularly, or in combination. The present invention can be implemented with various corrections and in various modifications, without departing from the spirit and scope of the present invention defined by the recitations of claims. Consequently, the description herein is only provided for the purpose of illustrating examples, and should by no means be construed to limit the present invention in any way.

The present application is based on Japanese Patent Application No. 2016-029884 filed on Feb. 29, 2016, entire contents of which are expressly incorporated herein by reference.

The invention claimed is:

1. A terminal comprising:
   a receiver that receives downlink control information (DCI) for scheduling an uplink shared channel in a given period with one of a plurality of different lengths; and
   a processor that controls transmission power of the uplink shared channel based on an accumulation value of transmission power control (TPC) commands in the DCI that are accumulated irrespective of the length of the given period.

2. The terminal according to claim 1, wherein the processor controls the transmission power of the uplink shared channel based on a maximum transmission power that is configured irrespective of the length of the given period.

3. The terminal according to claim 2, wherein the processor controls the transmission power of the uplink shared channel based on a path-loss that is calculated irrespective of the length of the given period.

4. The terminal according to claim 2, wherein the processor controls the transmission power of the uplink shared channel based on an offset that is configured irrespective of the length of the given period.

5. The terminal according to claim 2, wherein the processor controls the transmission power of the uplink shared channel based on a transmission bandwidth that is determined by the DCI.

6. The terminal according to claim 1, wherein the processor controls the transmission power of the uplink shared channel based on a path-loss that is calculated irrespective of the length of the given period.

7. The terminal according to claim 1, wherein the processor controls the transmission power of the uplink shared channel based on an offset that is configured irrespective of the length of the given period.

8. The terminal according to claim 1, wherein the processor controls the transmission power of the uplink shared channel based on a transmission bandwidth that is determined by the DCI.

9. A radio communication method, for a terminal, comprising:
   receiving downlink control information (DCI) for scheduling an uplink shared channel in a given period with one of a plurality of different lengths; and
   controlling transmission power of the uplink shared channel based on an accumulation value of transmission power control (TPC) commands in the DCI that are accumulated irrespective of the length of the given period.

* * * * *